(12) United States Patent
Barber et al.

(10) Patent No.: US 7,001,279 B1
(45) Date of Patent: Feb. 21, 2006

(54) SYSTEMS AND METHODS FOR PROVIDING MULTIPLE USER SUPPORT FOR SHARED USER EQUIPMENT IN A FANTASY SPORTS CONTEST APPLICATION

(75) Inventors: Dave Barber, Tulsa, OK (US); Patrick J. Hughes, Vienna, VA (US)

(73) Assignee: Interactive Sports Holdings, Inc., Tulsa, OK (US)

( * ) Notice: Subject to any disclaimer, the term of this patent is extended or adjusted under 35 U.S.C. 154(b) by 643 days.

(21) Appl. No.: 10/234,570

(22) Filed: Aug. 30, 2002

(51) Int. Cl.
*A63F 13/00* (2006.01)

(52) U.S. Cl. .............................. 463/42; 463/40; 725/46
(58) Field of Classification Search .................. 463/42
See application file for complete search history.

(56) References Cited

U.S. PATENT DOCUMENTS

| | | | |
|---|---|---|---|
| 4,918,603 A | 4/1990 | Hughes et al. ............... | 364/410 |
| 5,018,736 A | 5/1991 | Pearson et al. ............. | 273/439 |
| 5,263,723 A | 11/1993 | Pearson et al. ............. | 273/439 |
| 5,846,132 A | 12/1998 | Junkin .......................... | 463/42 |
| 5,860,862 A | 1/1999 | Junkin .......................... | 463/40 |
| 5,971,854 A | 10/1999 | Pearson et al. ............... | 463/41 |
| 6,193,610 B1 | 2/2001 | Junkin .......................... | 463/40 |
| 6,371,855 B1 * | 4/2002 | Gavriloff ...................... | 463/42 |
| 2002/0034980 A1 * | 3/2002 | Lemmons et al. ............ | 463/40 |
| 2002/0107073 A1 * | 8/2002 | Binney ......................... | 463/42 |
| 2002/0115488 A1 * | 8/2002 | Berry et al. .................. | 463/42 |
| 2002/0174430 A1 * | 11/2002 | Ellis et al. ..................... | 725/46 |

FOREIGN PATENT DOCUMENTS

WO   WO 03/015403   2/2002

OTHER PUBLICATIONS

Cliff Charpentier, "1984 Fantasy Football Digest," Fantasy Sports Inc., Jun. 1984.
Jim Donaldson, "The Official Fantasy Football League Manual," Contemporary Books, Inc., 1985.
Cliff Charpentier, "1985 Fantasy Football Digest," Lerner Publications Company, 1985.
"All Pro Yearbook 1987: The Fantasy Football Magazine," All Pro Publishing Company, 1987.
BBC Sport, *Fantasy Football Monthly, The Game* <http://bbcfootball.fantasyleague.co.uk/ et al.> (accessed Sep. 17, 2002*).
CNN Sports Illustrated, *Fantasy Football Challenge* <http://football2201.si.cnn.com/ et al.> (accessed Sep. 23, 2002*).
CNN Sports Illustrated, *Fantasy Golf Challenge* >http://gold5.si.cnn.com/ et al.> (accessed Sep. 23, 2002*).
CNN Sports Illustrated, *Fantasy Nascar Challenge* <http://racing20.si.cnn.com/ et al.> (accessed Sep. 23, 2002*).

(Continued)

*Primary Examiner*—Jessica Harrison
*Assistant Examiner*—Kesha Frisby
(74) *Attorney, Agent, or Firm*—Fish & Neave IP Group Ropes & Gray LLP

(57) ABSTRACT

This invention provides systems and methods for providing multiple user support for shared user equipment in fantasy sports contest applications. A fantasy sports contest application may allow users to setup unique user accounts, in which user specific information such as, for example, identification information, fantasy sports contest participation information, user preference information, or any other suitable information associated with the user, may be stored. The application may personalize fantasy sports contest information and displays for the user. Local fantasy sports leagues may be created for users of common user equipment so that they may compete against each other.

16 Claims, 17 Drawing Sheets

OTHER PUBLICATIONS

CBS SportsLine.com, *John B. Sample League* <http://cbs.sportsline.com/> (accessed Nov. 24, 1999).

CBS SportsLine.com, *Fantasy Baseball* <http://baseball101.fantasy.sportsline.com/ et al.> (accessed Sep. 23-24, 2002*).

CBS SportsLine.com, *Fantasy Football* <http://football2145.fantasy.sportline.com et al.> (accessed Sep. 23-24, 2002*).

CBS SporstLine.com, *Fantasy Golf* <http://golf1.fantasy.sportline.com/ et al.> (accessed Sep. 23, 2002*).

CBS SportsLine.com, *Fantasy Hockey* <http://hockey2102.fantasy.sportline.com/ et al/> (accessed Sep. 23-24, 2002*).

CBS SportsLine.com, *Fantasy Racing* <http://racing.fantasy.sportline.com/ et al.> (accessed Sep. 23, 2002*).

ESPN Internet Ventures, *ESPN Fantasy Games* <http://games.espn.go.com/cgi/home/request.dil?FRONTPAGE et al.> (accessed Sep. 16-18, 2002*).

"Fantasy-Football," Franchise Football League.

"Strat-O-Matic Pro Football," Strat-O-Matic Game Co. Inc.

"2000 Fantasy Basketball, Help Topics," Fantasy Sports Properties, Inc.

"2000 Fantasy Football, Help Topics," Fantasy Sports Properties, Inc.

"2000 Fantasy Hockey, Help Topics," Fantasy Sports Properties, Inc.

"2001 Fantasy Baseball, Help Topics," Fantasy Sports Properties, Inc.

* cited by examiner

SYSTEMS AND METHODS FOR PROVIDING MULTIPLE USER SUPPORT FOR SHARED USER EQUIPMENT IN A FANTASY SPORTS CONTEST APPLICATION

BACKGROUND OF THE INVENTION

This invention relates to systems and methods for providing a fantasy sports contest application, and more particularly, this invention relates to systems and methods for providing multiple user support on shared user equipment in a fantasy sports contest application.

Athletic endeavors have long supported a broad range of secondary competitions, which include wagering on the outcome of particular games and wagering on the performance of a particular player.

In known fantasy sports contests, a user selects a roster, a team, a particular individual, or a group of individuals in an athletic contest. The user is given the ability to take on the role of a fictional general manager with powers which may include the ability to draft, trade, dismiss and otherwise manage the roster of players on the user's fantasy sports team.

Conventionally, either a fantasy sports contest provider or a league commissioner sets the rules under which a group of fantasy sports users compete against each other in a fantasy sports contest. For example, for every goal scored in real-life by a member of the user's fantasy soccer team, five points may be awarded to the user in the fantasy sports contest.

The real-life athletic events upon which a fantasy sports contest may be based are varied, and typically involve selecting players from real-life team sports (e.g., football, baseball, basketball, hockey, soccer or rugby), selecting players from real-life individual sports (e.g., golf, tennis or automotive racing), or selecting participants from competitions involving animals (e.g., horse and dog racing). The user's selections are typically stored in the user's fantasy sports contest roster. The performance of these selections in real-life competitions collectively determines the user's performance in the fantasy sports contest.

Current applications identify a user based on the equipment that that the user uses. This method of identification allows only one user to be uniquely identified per each identifiable equipment.

Accordingly, it is desirable to provide a fantasy sports contest application in which multiple users using shared user equipment may be allowed to participate as individual users.

SUMMARY OF THE INVENTION

It is therefore an object of the present invention to provide a fantasy sports contest application in which multiple users using shared user equipment may be allowed to participate as individual users.

This and other objects of the invention are accomplished in accordance with the principles of the present invention by providing multiple user support for shared user equipment in fantasy sports contest applications.

In some embodiments of the present invention, the fantasy sports application may personalize fantasy sports contest information and display screens based on the user's identity. In these embodiments, the fantasy sports contest application may allow the user to create a unique user account. A user account may include information specific to the user such as identification information (e.g., user name and password), fantasy sports contest participation information (e.g., leagues that the user participates in, team compositions, etc.), user preference information (e.g., preference for fantasy sports contest application interface), or any other suitable information. Using the identification information, the fantasy sports contest application may identify the user associated with the user account. The fantasy sports contest application may then provide personalized fantasy sports contest information and displays (e.g., personalized user performance information, league information, team information, personalized user interface, etc.) to the user based on the user's preference information stored in the user account.

In some embodiments of the present invention of the present invention, the fantasy sports contest application may determine the user's identity through login procedures. For example, when the user initially accesses the fantasy sports contest application, the fantasy sports contest application may prompt the user to supply user identification information in a login screen. For example, the fantasy sports contest application may prompt the user for a user name and a corresponding password or any other suitable identification information. Upon receiving such information from the user, the fantasy sports contest application may then determine the user's identity by, for example, comparing the login information supplied by the user to saved user identification information, or using any other suitable approach for user recognition. The identity of the user may be used by the fantasy sports contest application to retrieve user account information such as, for example, fantasy sports participation information (e.g., leagues that the user participates in, team compositions, etc.), user preference information (e.g., preference for fantasy sports contest application interface), or any other suitable user related information. The fantasy sports contest application may then personalize fantasy sports contest information and displays (e.g., performance information, league information, team information, user interface, etc.) for the user based on information specified in the user account.

Alternatively, the fantasy sports contest application may identify the user through a variety of other suitable means. In one suitable approach, the fantasy sports contest application may use services provided by companies such as Nielsen Media Research of New York, N.Y. to identify the user. For example, the fantasy sports contest application may receive the user's identity from a People Meter or similar device that is implemented by Nielsen Media Research to identify users who are watching television and to track their activities. In another suitable approach, the fantasy sports contest application may identify the user through a menu. For example, the fantasy sports contest application may allow the user to choose his account from a list. In yet another suitable approach, the fantasy sports contest application may use conditional access devices such as a security card to identify the user. Any other suitable means for identifying the user may be used.

In some embodiments of the present invention, the fantasy sports contest application may enable the user to form local fantasy sports leagues. A local fantasy sports league may allow a group of users sharing a common user equipment to compete against each other. For example, the fantasy sports contest application may allow a family of three users, who share a common interactive television system, to create a family basketball league in which they may compete against each other. To create such a league, the user may indicate a desire to create a local fantasy sports contest league for a particular sport, for example, during the user account setup process. The fantasy sports contest application, in response to receiving the user's indication, may create the league for the user. To join such a league, the user may indicate a particular local fantasy sports contest league to join, for example, during the user account setup process. The fantasy sports contest application, in response to receiving to the user's indication, may add the user to the indicated league. The fantasy sports contest application may store any information associated with the local fantasy sports league locally on the user equipment. Alternatively, the fantasy sports contest application may store some or all of such information at one or more remote locations (e.g., a television distribution facility).

As an example, the fantasy sports contest application may enable a first member of a family to create a user account and to establish a family basketball league using user equipment. The fantasy sports contest application may then allow additional members of the family, using the same user equipment that was used by the first member, to create their own unique user accounts and to join the family basketball league created by the first member.

In some embodiments of the present invention, the fantasy sports contest application may allow the user, who competes in multiple fantasy sports leagues involving different sports, to participate in one or more fantasy all-around leagues. A fantasy all-around league may be any league that allows the user to compete based on a combination of the user's performances in the multiple fantasy sports leagues involving different sports.

For example, the fantasy sports contest application may allow the user, who currently competes in a fantasy football league and a fantasy basketball league to participate in a fantasy all-around league that evaluates the user against other users based on a combination of the user's performances in the fantasy football league and the fantasy basketball league.

In some embodiments of the present invention, the fantasy sports contest application may determine that the user currently competes in more than two fantasy sports leagues involving different sports. In these embodiments, the fantasy sports contest application may allow the user to choose a subset that includes at least two of these leagues for evaluation in the all-around league.

For example, the fantasy sports contest application may allow the user who currently competes in a fantasy football league, a fantasy basketball league, and a fantasy baseball league, to choose any subset that includes at least two of the three leagues for evaluation in the all-around league. The user may choose, for example, the football league and the basketball league, the football league and the baseball league, the basketball league and the baseball league, or all three of the leagues for evaluation in the all-around league.

In some embodiments of present invention, the fantasy sports contest application may allow the user to select the percentage participation of each fantasy sports league that is involved in the calculation of the user's performance in the all-around league. For example, the user in the previous example may choose to assign a weight of thirty percent to the user's performance in the fantasy football league in the calculation of the user's performance in the fantasy all-around league. Because the user's all-around league includes only two leagues, the fantasy sports contest application may then automatically assign a weight of seventy percent to the user's performance in the basketball league in the calculation of the user's performance in the fantasy all-around league. In some embodiments, the fantasy sports contest application may assign set percentages for each of the leagues involved.

In some embodiments of the present invention, real-life players that have been selected in one type of fantasy sports league in a first season may be made available for pre-draft selection in another type of fantasy sports league in a second season on a right of first refusal basis to users who previously had those players on their rosters. For example, a college basketball player in the 2000 season may be drafted in real-life as an NBA player in the 2001 season. In an application that supports both college and professional basketball and uses a draft that limits the number of users that may select a given real-life player, the fantasy sports contest application may make the player, who was on the user's fantasy college basketball roster available for selection by the user in the fantasy NBA leagues in the 2001 contest. This feature is particularly useful to the user in leagues that use exclusive rosters (e.g., leagues in which real-life players may only be on a fixed number of rosters—typically, on just one roster). This feature rewards the user who is able to identify skilled players early in their careers. The feature may also be apply to sports in which athletes may be promoted in real-life to more competitive leagues (e.g., the English Premiership football league).

In the event that the user declines his first right to refusal by a set deadline or fails to make any required adjustments to his roster (e.g., reducing the number of player to within a set maximum), the fantasy sports contest application may then make the real-life player available to other users.

In some embodiments of the present invention, the fantasy sports contest application may determine, in response to the user selecting to participate in a fantasy sports league, whether the user has drafted players for other fantasy sports leagues that are now available for draft in the fantasy sports league that the user is currently trying to participate in. If the fantasy sports contest application identifies at least one of such players, the fantasy sports contest application may allow the user to select at least some of those players for inclusion in the user's team for the fantasy sport league that the user is currently trying to participate in.

Further features of the invention, its nature and various advantages will be made apparent from the accompanying drawings and the following detailed description.

DETAILED DESCRIPTION OF THE INVENTION

Figure 1:
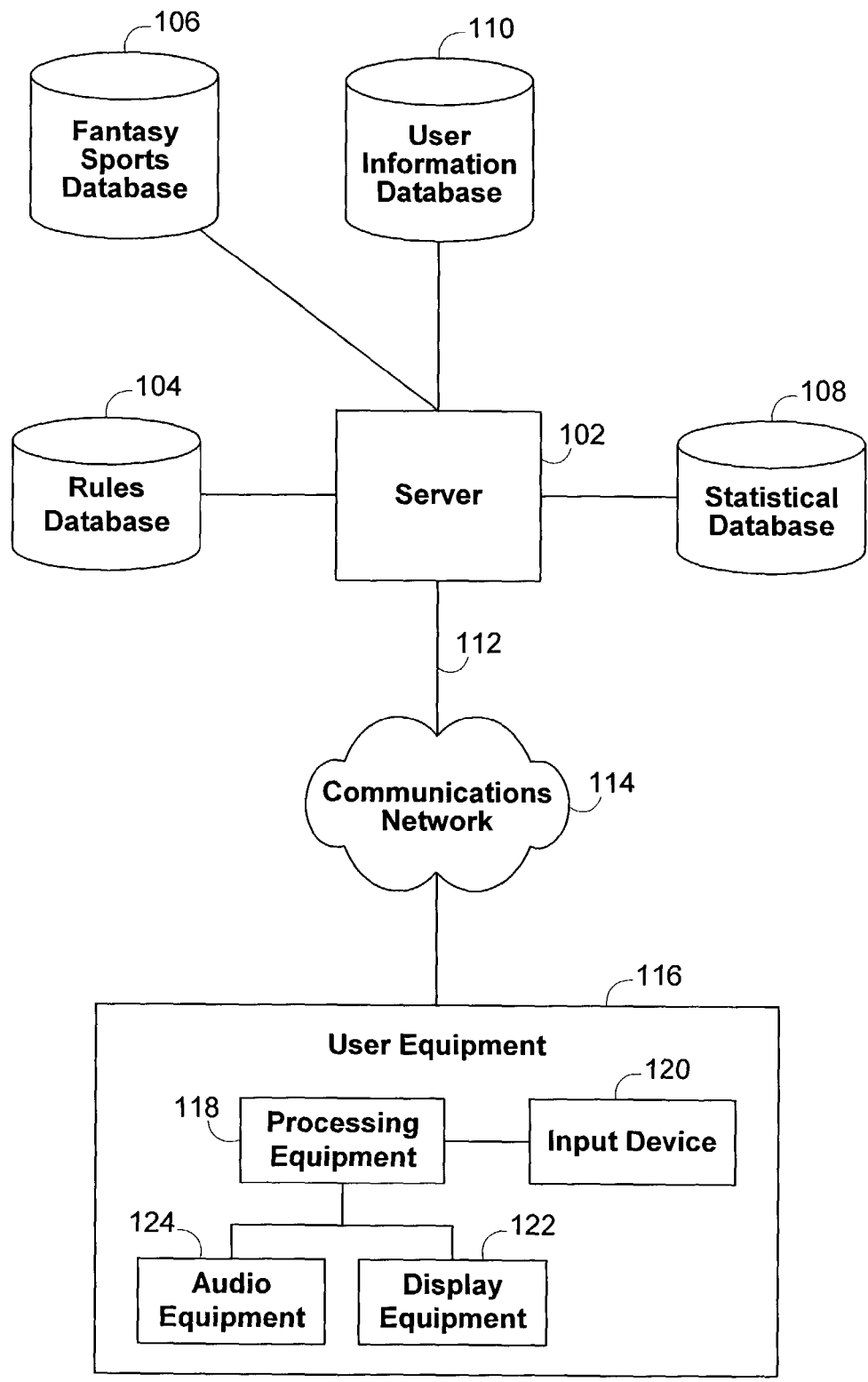
FIG. 1 is a schematic diagram of an illustrative client/server system in accordance with one embodiment of the present invention.

The fantasy sports contests of the present invention may include any suitable sports contest in which the user is given the ability to make decisions that may affect the standing of the user in the sports contest. For example, in typical team-oriented fantasy sports contests, the user may participate in the capacity of a general manager. In this situation, the user may be have responsibilities such as creating a team roster (e.g., drafting players), selecting reserves, making trades, and otherwise maintaining the composition of the user's team roster. It will be understood that any other suitable decision-making capability may be given to the user in a fantasy sports contest in addition to or in place of those indicated above.

The fantasy sports contest of the present invention need not be limited or restricted in time. For example, a fantasy sports contest may last an entire season, a portion of the season, a definite period of time (e.g., one month, two weeks, three days, one hour, etc.), the duration of a particular event (e.g., Wimbledon, etc.), a portion of a particular event, or any other suitable period of time.

In one suitable approach, fantasy sports contests may include contests in which the user is not necessarily playing the role of a general manager. For example, fantasy sports contests may involve the user determining or guessing (i.e., blindly or with calculation) whether particular outcomes will occur (e.g., whether a particular golfer will make the next put). Any such suitable decision-making may be the basis of a fantasy sports contest or a part of a fantasy sports contest.

The fantasy sports contests of the present invention may use any suitable one or more scoring systems. For example, existing fantasy scoring systems include straight point systems (e.g., points are awarded and subtracted based on real-life plays without regard to the performance of other players on other fantasy teams in a league), rotisserie systems (e.g., points are awarded based on the user's relative ranking against other users), head-to-head systems (e.g., users in a league are matched against one another in a round-robin series of one-on-one contests during the course of a season). These are merely illustrative scoring systems. Any other suitable scoring system may be used in the fantasy sports contests of the present invention.

It will be understood that the above are merely illustrative elements of fantasy sports contests. Any other suitable arrangement or approach may be used. It will further be understood that the nature of the fantasy sports contests may vary depending on which activity or sport is involved or based on any other suitable criteria.

The fantasy sports contest application of the present invention may provide to the user fantasy sports contest-related information. Fantasy sports contest-related information may include any suitable information associated with one or more fantasy sports contests in which the user participates or in which the user may have an interest. For example, fantasy sports contest-related information may include information regarding the user's one or more rosters, the user's standing in one or more fantasy sports contests, point tallies associated with the user in one or more fantasy sports contests, information regarding the number of trades that the user may make, information regarding the amount of fantasy money available to the user for contracting players for a roster, information regarding deadlines to make trades or to perform any other suitable task associated with one or more fantasy sports contests, or any other suitable information.

Fantasy sports contest-related information may also include information regarding real-life athletes (e.g., names, statistics, etc.), real-life sports leagues (e.g., game schedules, standings, etc.), real-life sporting events (e.g., baseball games, golf tournaments, tennis matches, etc.), sports arenas, weather information, sports commentary, or any other suitable information regarding real-life sports or events that may have an affect on the one or more fantasy sports contests in which the user participates.

The present invention is primarily described herein in terms of the fantasy sports contest application. It will be understood that any other suitable software, hardware, or both may be used in conjunction with the fantasy sports contest application to implement some or all of the present invention.

FIG. 1 shows an illustrative client/server system 100 in accordance with one embodiment of the present invention. A fantasy sports contest application may be entirely or partially implemented on one or more servers 102. Server 102 may access one or more databases having information related to fantasy sports contests such as, for example, rules database 104, fantasy sports database 106, statistical database 108, user information database 110, or any other suitable database.

Rules database 104 may be used to store rules for one or more fantasy sports contests. Statistical database 108 may include real-life statistical information on athletes in one or more real-life sports categories (e.g., baseball, basketball, football, etc.). Fantasy sports database 106 may store any other types of data used in conjunction with the operation of one or more fantasy sports contests (e.g., game time, game duration, etc.). User information database 110 may include user account information, such as, for example, user identification information (e.g., user name and password), fantasy sports participation information (e.g., leagues that the user participates in, team compositions, etc.), preference information (e.g., preference for fantasy sports contest application interface), or any other information specific to the user.

Communication network 114 may be used for communication between user equipment 116 and servers 102. Multiple communication networks 114 and multiple user equipment 116 may be desired, although only one of each is shown to avoid over-complicating the drawing. User equipment 116 may include processing equipment 118 for receiving and communicating fantasy sports contest related data and user account information. For example, user account information submitted by a user during the user account setup process may be transmitted by processing equipment 118 to servers 102 for further processing and storage. In some embodiments of the present invention, processing equipment 118 may process and store user account information locally on user equipment 116. In these embodiments, processing equipment 118 may identify local users without searching or requesting for user account information from remote storage locations (e.g., server 102). The user may interact with processing equipment 118 using input device 120. Input device 120 may be, for example, a remote control, a keyboard, a voice-recognition device, a track ball, a mouse, or any other suitable device.

Video and fantasy sports contest application related displays received by processing equipment 118 may be displayed for the user on display equipment 122. Display equipment 122 may be for example, a television, a monitor, or any other suitable display equipment. Audio information generated by processing equipment 118 may be played for the user using audio equipment 124 (e.g., speakers). Audio equipment 124 may be a stand-alone equipment or integrated with display equipment 122.

Figure 2:
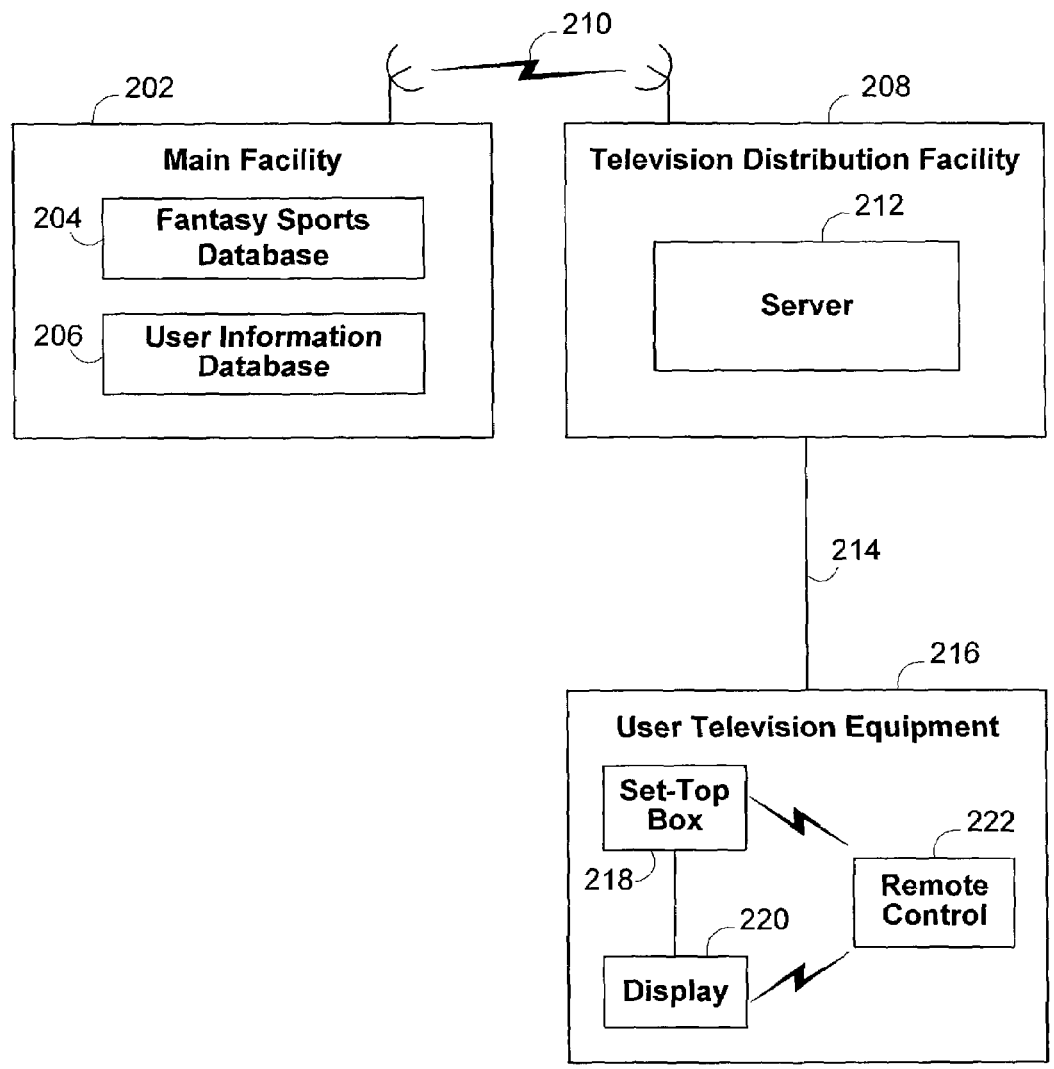
FIG. 2 is a schematic diagram of an illustrative interactive television system in accordance with one embodiment of the present invention.

In one embodiment of the present invention, the fantasy sports contest application may be implemented on an interactive television platform. FIG. 2 shows such an illustrative interactive television platform 200. Main facility 202 may include fantasy sports database 204 and user information database 206. Fantasy sports database 204 may include fantasy sports contest related information, such as, for example, schedule, draft roaster, rules, or any other suitable information relevant to the operation of one or more fantasy sports contests. User information database 206 may include user account information, such as, for example, user identification information (e.g., user name and password), fantasy sports participation information (e.g., leagues that the user participates in, team compositions, etc.), preference information (e.g., preference for fantasy sports contest application interface), or any other information specific to the user.

Data from main facility 202 may be communicated to television distribution facility 208 over communication link 210. Data files from main facility 202 may be, for example, encapsulated as objects communicated using a suitable Internet based addressing scheme and protocol stack (e.g., a stack using user datagram protocol (UDP) and Internet protocol (IP)). Communication path 210 may be any suitable communication path for communicating fantasy sports contest-related data (e.g., rosters, standings, statistical information, or any other suitable data) and user account information. Communication path 210 may be, for example, a satellite link, a telephone link, a cable or fiber optic link, a microwave link, an Internet link, a combination of such links, or any other suitable communication link. In some arrangements, video signals may be transmitted over communication path 210. In these arrangements, a relatively high bandwidth link such as a satellite link my be preferable to a relatively low bandwidth link such as a telephone line for efficiency.

Television distribution facility 208 may be any suitable facility for distributing television signals to one or more remote user equipment. Television distribution facility 208 may be, for example, a cable system headend, a broadcast distribution facility, a satellite television distribution facility, or any other suitable facility. Television distribution facility 208 may receive fantasy sports contest-related data (e.g., rosters, standings, statistical information, or any other suitable data), user account information (e.g., user name, password, fantasy sports user participation information, user preference for fantasy sports contest application interface, or any other suitable user-specific information), and any other suitable data from main facility 202. Television distribution facility 208 of some embodiments may also receive user account information from external facilities that are similar to but separate from main facility 202. Such external facility may be any suitable facility for providing user account information to main facility 202 for localization and distribution.

Regardless of the data source, fantasy sports contest-related data and user account information may be maintained on server 212 within television distribution facility 208 if desired. Server 212 may be capable of handling text, graphics, video, and providing interactive services such as, for example, personalizing fantasy sports contest application interface based on user preferences, handling product and service order, user tracking, or any other suitable interactive services.

Television distribution facility 208 may communicate fantasy sports contest-related data and application, user account information, and any other suitable data via communication path 214 to user television equipment 216. Data may be distributed by television distribution facility 208 using a variety of techniques. For example, text and graphics may be distributed over an out-of-band channel using an out-of-band modulator, while large quantity of video may be distributed using one or more digital channels for better efficiency. If desired, text and graphics may also be communicated using digital channels.

Communications path 214 may be any communications path suitable for communicating fantasy sports contest-related information and user account information. Communications path 214 preferably has sufficient bandwidth to allow television distribution facility 208 to also communicate scheduled television programming, pay programming, advertising and promotional videos, graphics, and any other suitable data to user television equipment 216. Communications path 214 may be, for example, a satellite link, a telephone network link, a cable or fiber optic link, a microwave link, an Internet link, a data-over-cable service interface specification (DOCSIS) link, a combination of such links, or any other suitable communication path. There are typically multiple pieces of user television equipment 216 and multiple associated communications paths 214, although only one of each are shown in FIG. 2 to avoid over-complicating the drawings. If desired, fantasy sports contest-related data, user account information, or any other suitable data may be communicated to user television equipment 216 by one or more distribution facilities that are similar to, but separate, from television distribution facility 208 using one or more communications paths that are separate from communications path 214 (e.g., using Internet links).

User television equipment 216 may include a receiver such as, for example, set-top box 218 or any other suitable television or computer equipment into which circuitry similar to set-top box circuitry has been integrated. For clarity, the present invention is described primarily in the context of user television equipment having a set-top box. However, it should be apparent to those skilled in the art that the fantasy sports contest application may be implemented using user television equipment 216 that is based on, for example, a handheld computing device, or any other suitable equipment. In some embodiments of the present invention, a fantasy sports contest application may be implemented using a client-server arrangement, in which user television equipment 216 may be a client processor and one or more servers such as server 212 may act as the server processor.

Fantasy sports contest-related data, user account information, and other related data may be communicated to set-top box 218 periodically (e.g., once per hour, once per day, etc.), continuously, or on-demand depending on the chosen implementation. For example, it may be more efficient to distribute user account information on-demand because only a subset of the available user account information may be needed at any given user equipment 216. In some embodiments of the present invention, data may be communicated from set-top box 218 to television distribution facility 208 for processing. Such data may include, for example, requests for certain fantasy sports contest-related data, submitted data (e.g., user account setup data, etc.), or any other suitable data. Television distribution facility 208 may process the data and take appropriate action, such as, for example, storing user account information on server 212, communicating user account information to main facility 202, providing the user with information about a fantasy sports league, or perform any other suitable action. In some embodiments of the present invention, user account information submitted during the user account setup process may be stored locally on set-top box 218. In these embodiments, set-top box 218 may identify local users without having to request for user account information from television distribution facility 208 or any other suitable remote location.

If desired, certain functions such as a user's instructions to make a change in his roster or request to join a local fantasy sports league may be transmitted by set-top box 218 over separate communications paths to facilities that are separate from television distribution facility 208 (e.g., main facility 102 of FIG. 1) for processing. In these embodiments, some of the communication involving set-top box 218 may be made directly with the separate facility.

Each set-top box 218 may have a processor to handle tasks associated with implementing a fantasy sports contest application on set-top box 218. In embodiments that stores user account information locally on user television equipment 216, set-top box 218 may also include a database for storing such information. Television distribution facility 208 may include a processor for handling tasks associated with the communication of fantasy sports contest-related data, user account information, or any other suitable data.

Fantasy sports contest-related data and user account information received from television distribution facility 208 by set-top box 218 may be displayed for the user on display 220. One or more remote controls such as remote control 222 may be used to control set-top box 218 and display 220. Alternatively, user input devices such as, for example, wireless keyboards, mice, trackballs, or any other suitable input devices may be used to communicate with set-top box 218 and display 220 in place of remote control 222.

Figure 3:
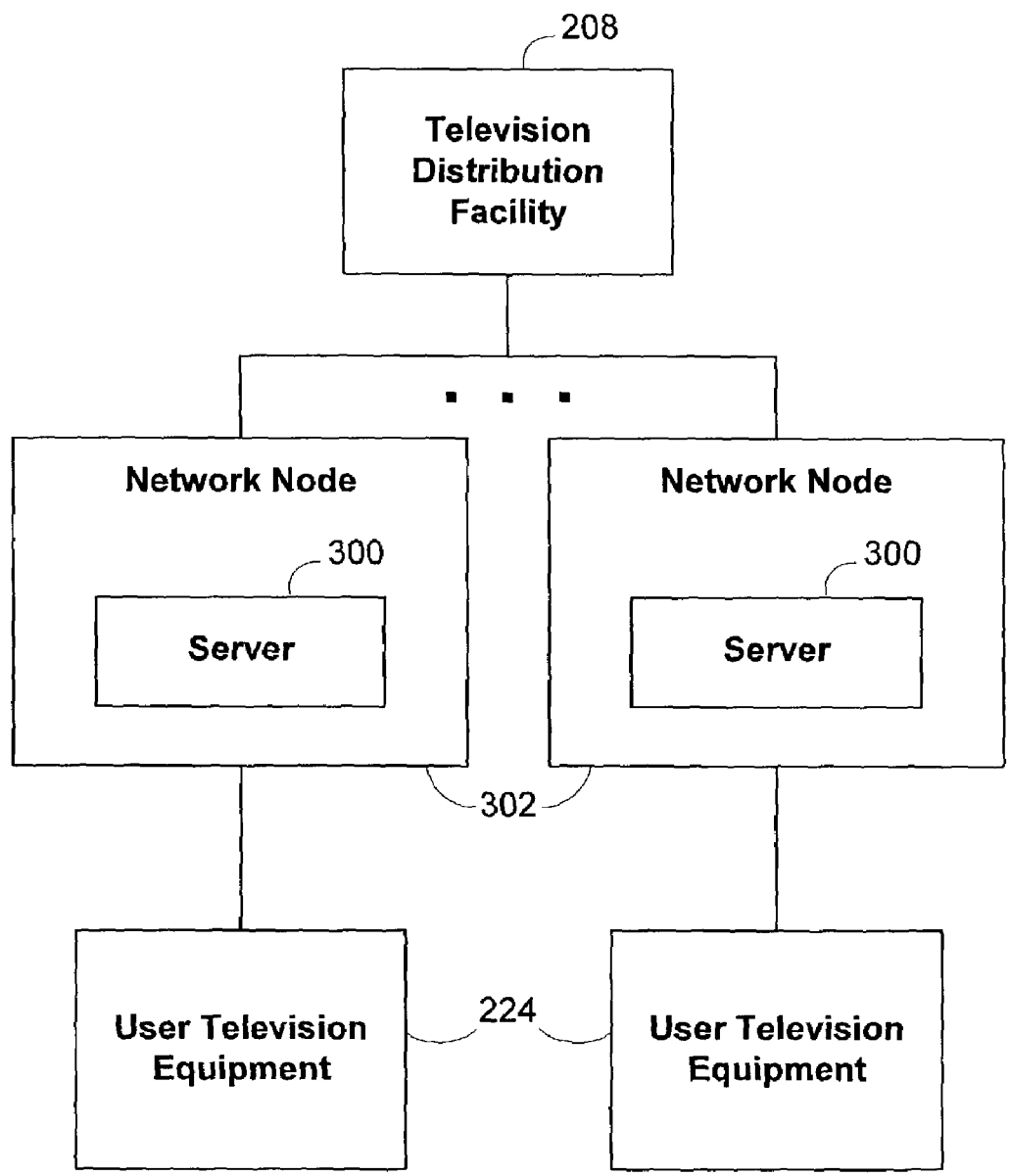
FIG. 3 is a schematic diagram of an illustrative interactive television system having network nodes in accordance with one embodiment of the present invention.

FIG. 3 shows an alternative arrangement for communicating data from television distribution facility 208. Server 212 residing at television distribution facility 208 (FIG. 2) may be replaced by or used in conjunction with servers 300 located at network nodes 302. Fantasy sports contest-related data and user account information may be downloaded periodically (e.g., once per hour, once per day, etc.) or continuously in a looping arrangement from servers 300 and stored locally on user television equipment. When a looping arrangement is implemented, a map may be provided periodically to indicate the location of the most recent information. Fantasy sports contest application implemented using set-top box 218 (FIG. 2) may access downloaded data locally when needed and use the map to locate the most recent downloaded information on the digital channels.

In another suitable arrangement, server 212 (FIG. 2) or servers 300 may be used separately or in conjunction to provide user account information upon request. If desired, server 212 or servers 300 may provide instructions to set-top box 218 (FIG. 2) informing the location of the user account information on a particular digital channel. User account information may be communicated to set-top box 218 along with fantasy sports contest-related data. A cable modem may be used to distribute texts, graphics, and videos. Fantasy sports contest-related data and user account information may be distributed using a combination of these techniques or any other suitable technique.

The fantasy sports contest application may be any suitable software, hardware, or both that may be used to implement the features of the present invention. The fantasy sports contest application may be implemented at any suitable location in system 100 of FIG. 1. For example, the fantasy sports contest application may be implemented at user equipment 116, at server 102, at any other suitable location (that is not necessarily shown in system 100), or at any combination thereof.

With regard to FIG. 2, the fantasy sports contest application may also be implemented at any suitable location in system 200. For example, the fantasy sports contest application may be implemented at television distribution facility 208, at main facility 202, at any other suitable location (that is not necessarily shown in system 200), or at any combination thereof. For example, in system 200 of FIG. 2, certain portions of the fantasy sports contest application may be implemented at user television equipment 216, (e.g., those portions that implement features involved in user interaction), whereas certain other portions of the fantasy sports contest application may be implemented at television distribution facility 208 (e.g., those portions that implement features involved in the processing of client requests and in the tracking of the performance of users).

Any such suitable arrangement of the fantasy sports contest application may be implemented in accordance with the present invention.

Aspects of the operation of fantasy sports contest applications are described in U.S. Pat. No. 4,918,603 (Hughes, et al.), U.S. Pat. No. 5,846,132 (Junkin), U.S. Pat. No. 5,971,854 (Junkin), and U.S. Pat. No. 6,193,610 (Junkin), which are all hereby incorporated by reference herein in their entireties.

Multiple user support for shared user equipment may be provided in a fantasy sports contest application to allow one or more users to participate in fantasy sports contests using a common user equipment. In some embodiments of the present invention, the fantasy sports application may personalize fantasy sports contest information and display screens based on the user's identity. In these embodiments, the fantasy sports contest application may allow the user to create a unique user account. A user account may include information specific to the user such as identification information (e.g., user name and password), fantasy sports contest participation information (e.g., leagues that the user participates in, team compositions, etc.), user preference information (e.g., preference for fantasy sports contest application interface), or any other suitable information. Using the identification information, the fantasy sports contest application may identify the user associated with the user account. The fantasy sports contest application may then provide personalized fantasy sports contest information and displays (e.g., personalized user performance information, league information, team information, personalized user interface, etc.) to the user based on the user's preference information stored in the user account.

In some embodiments of the present invention, the fantasy sports contest application may determine the user's identity through login procedures. For example, when the user initially accesses the fantasy sports contest application, the fantasy sports contest application may prompt the user to supply user identification information in a login screen. For example, the fantasy sports contest application may prompt the user for a user name and a corresponding password or any other suitable identification information. Upon receiving such information from the user, the fantasy sports contest application may then determine the user's identity by, for example, comparing the login information supplied by the user to saved user identification information, or using any other suitable approach for user recognition. The identity of the user may be used by the fantasy sports contest application to retrieve user account information such as, for example, fantasy sports participation information (e.g., leagues that the user participates in, team compositions, etc.), user preference information (e.g., preference for fantasy sports contest application interface), or any other suitable user related information. The fantasy sports contest application may then personalize fantasy sports contest information and displays (e.g., performance information, league information, team information, user interface, etc.) for the user based on information specified in the user account.

In some embodiments of the present invention, the fantasy sports contest application may enable the user to form local fantasy sports leagues. A local fantasy sports league may allow a group of users sharing a common user equipment to compete against each other. For example, the fantasy sports contest application may allow a family of three users, who share a common interactive television system, to create a family basketball league in which they may compete against each other. To create such a league, the user may indicate a desire to create a local fantasy sports contest league for a particular sport, for example, during the user account setup process. The fantasy sports contest application, in response to receiving the user's indication, may create the league for the user. To join such a league, the user may indicate a particular local fantasy sports contest league to join, for example, during the user account setup process. The fantasy sports contest application, in response receiving to the user's indication, may add the user to indicated league. The fantasy sports contest application may store any information associated with the local fantasy sports league locally on the user equipment. Alternatively, the fantasy sports contest application may store some or all of such information at one or more remote locations (e.g., a television distribution facility).

As an example, the fantasy sports contest application may enable a first member of a family to create a user account and to establish a family basketball league using user equipment. The fantasy sports contest application may then allow additional members of the family, using the same user equipment that was used by the first member, to create their own unique user accounts and to join the family basketball league created by the first member.

Figure 4:
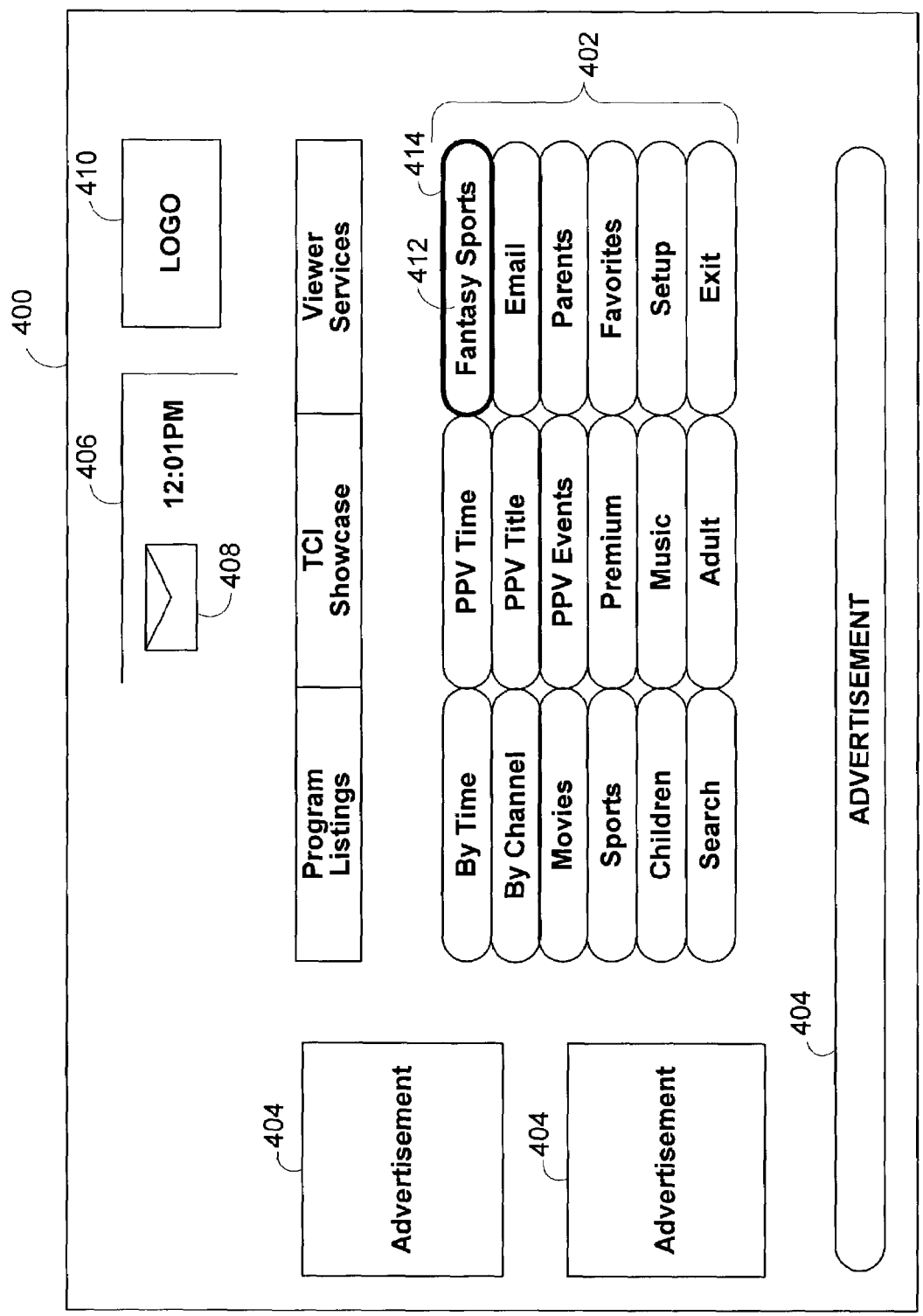
FIG. 4 is an illustrative interactive television menu screen having an option for launching a fantasy sports contest application in accordance with one embodiment of the present invention.

FIG. 4 shows an illustrative interactive television menu screen 400 having a fantasy sports option for launching a fantasy sports contest application in accordance with one embodiment of the present invention. Screen 400 may include, for example, an interactive television options menu 402, one or more advertisements 404, a clock 406, a mail indicator 408, and one or more sponsor or provider logos 410. Interactive television options menu may include a fantasy sports option 412. When selected by the user, fantasy sports option 412 may launch a fantasy sports contest application. The user may select fantasy sports option 412 by, for example, using up or down buttons on a remote control to position highlight region 414 over fantasy sports option 412 and pressing an "OK" or "Select" button to select the option, using a mouse to direct a cursor to fantasy sports option 412 and click-select the option, or using any other suitable approach.

Interactive television menu screen 400 is merely illustrative of such a display screen. Various other suitable arrangements may be used in its place.

Figure 5:
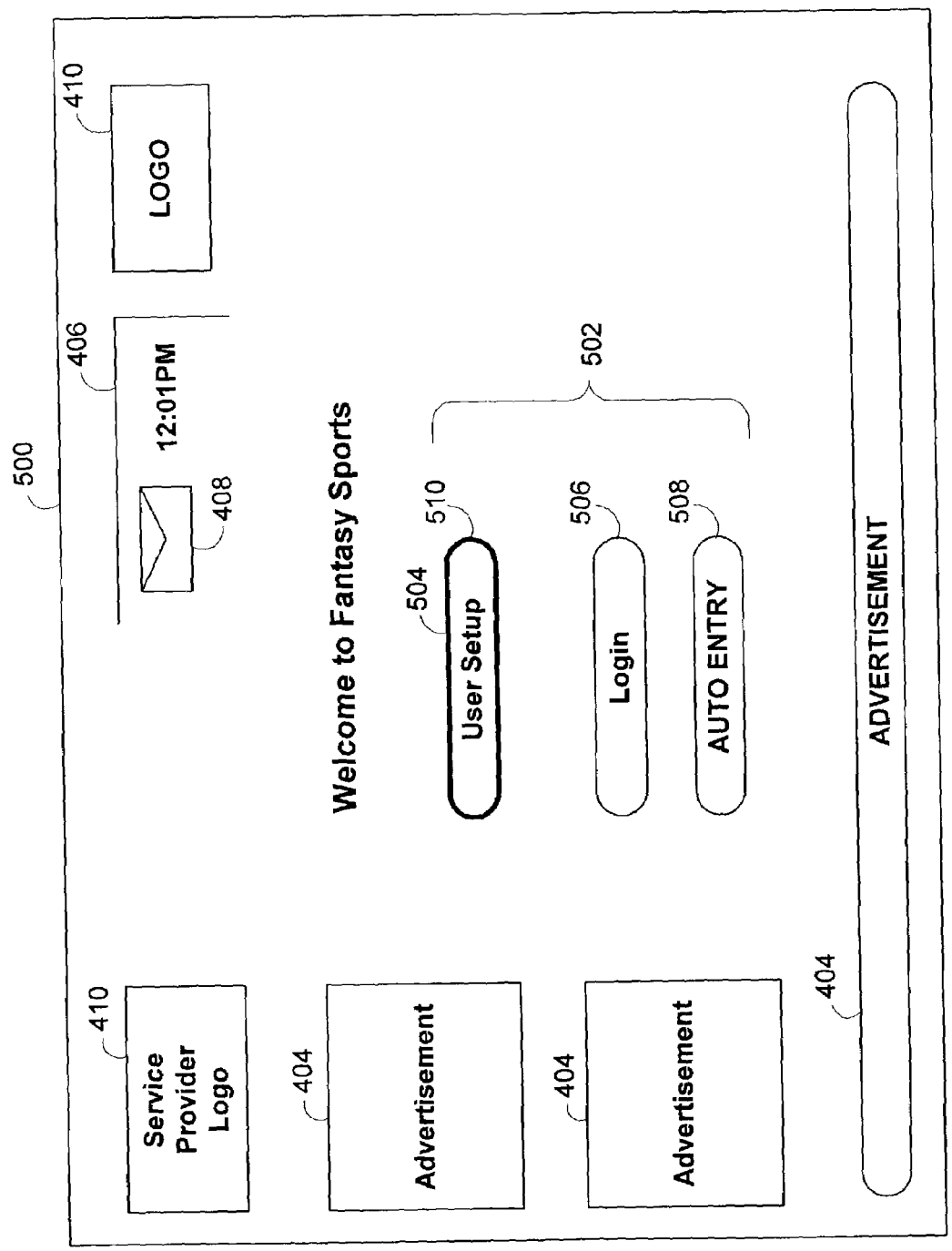
FIG. 5 is an illustrative fantasy sports contest application main menu screen in accordance with one embodiment of the present invention.

FIG. 5 shows an illustrative fantasy sports contest application main menu screen 500 in accordance with one embodiment of the present invention that may be displayed to a user in response to the user selecting fantasy sports option 414 of FIG. 4. Screen 500 may include an option menu 502 including options related to user identification. User setup option 504, when selected, may provide the necessary information to enable a new user to set up a user account. Login option 506, when selected, may allow a user having an existing user account to login to the user specific portions of the fantasy sports contest application in which the user may have access to fantasy sports contest information that is directed to the user (e.g., the user's contest performance, etc.). Auto entry option 508, when selected, may provide a shortcut for a user who doesn't share user equipment with another user to login to the fantasy sports contest application as a default user. The user logged as a default user may modify the default user account to reflect the user's identity and preferences.

The user may select an option from option menu 502 by, for example, using up or down buttons on a remote control to position highlight region 510 over an option and then pressing an "OK" or "Select" button on a remote control to select the option, using a mouse to direct a cursor to an option and click-select it, or using any other suitable approach.

Fantasy sports contest application main menu screen 500 is merely illustrative of such a display screen. Various other suitable arrangements may be used in its place.

Figure 6:
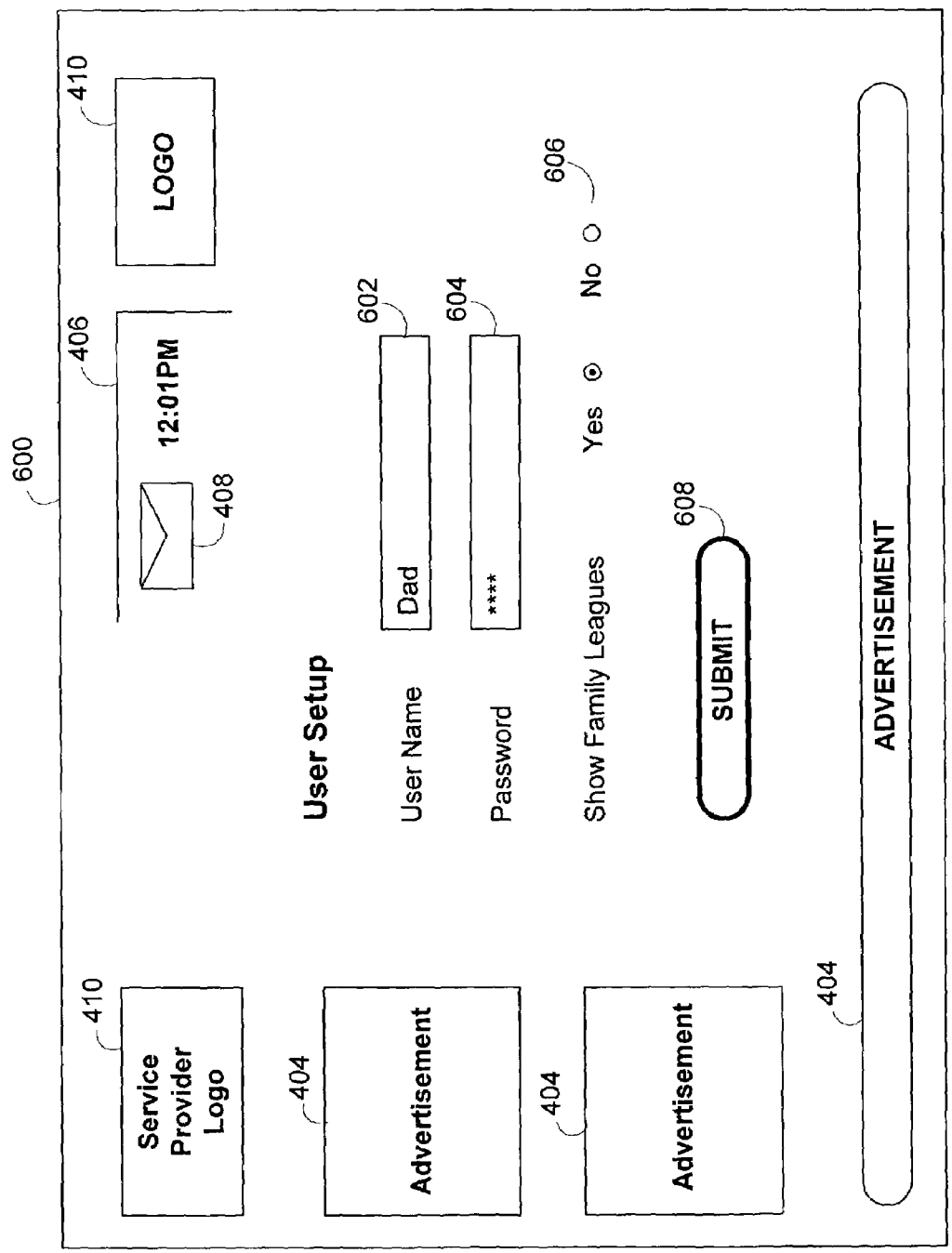
FIG. 6 is an illustrative fantasy sports contest application user setup screen in accordance with one embodiment of the present invention.

FIG. 6 shows an illustrative fantasy sports contest application user setup screen 600 in accordance with one embodiment of the present invention that may be shown in response to a user selecting user setup option 504 in FIG. 5. User setup screen 600 may provide a user setup form for the user to supply a user name and a corresponding password in fields 602 and 604 respectively. In some embodiments of the present invention, the fantasy sports contest application may check the user name entered in field 602 against stored user names in a uniqueness test. If the entered user name conflicts with a stored user name, the fantasy sports contest application may prompt the user to enter a different user name. In one suitable approach, the fantasy sports contest application may prohibit the user from submitting user setup information in screen 600 until a unique user name is entered. In another suitable approach, the fantasy sports contest application may prompt the user to select an account from a list of user accounts associated with a parental control feature. The fantasy sports contest application may obtain the appropriate information associated with the selected account to complete user setup. Any other suitable approach may be used.

Also in screen 600, the fantasy sports contest application may allow the user to indicate a desire to view family leagues using a radio button provided in selection area 606. A family league is a fantasy sports local league that is exclusively created for users sharing a common user equipment to compete again each other. For example, the family league may be a head to head football contest between two family members sharing the same user television equipment. When sharing a common user equipment, it may be possible that some part of the equipment may be used by only a single person (e.g., a personal digital assistant). The user may submit user setup information using submit button 608.

Fantasy sports contest application user setup screen 600 is merely illustrative of such a display screen. Various other suitable arrangements may be used in its place.

Figure 7:
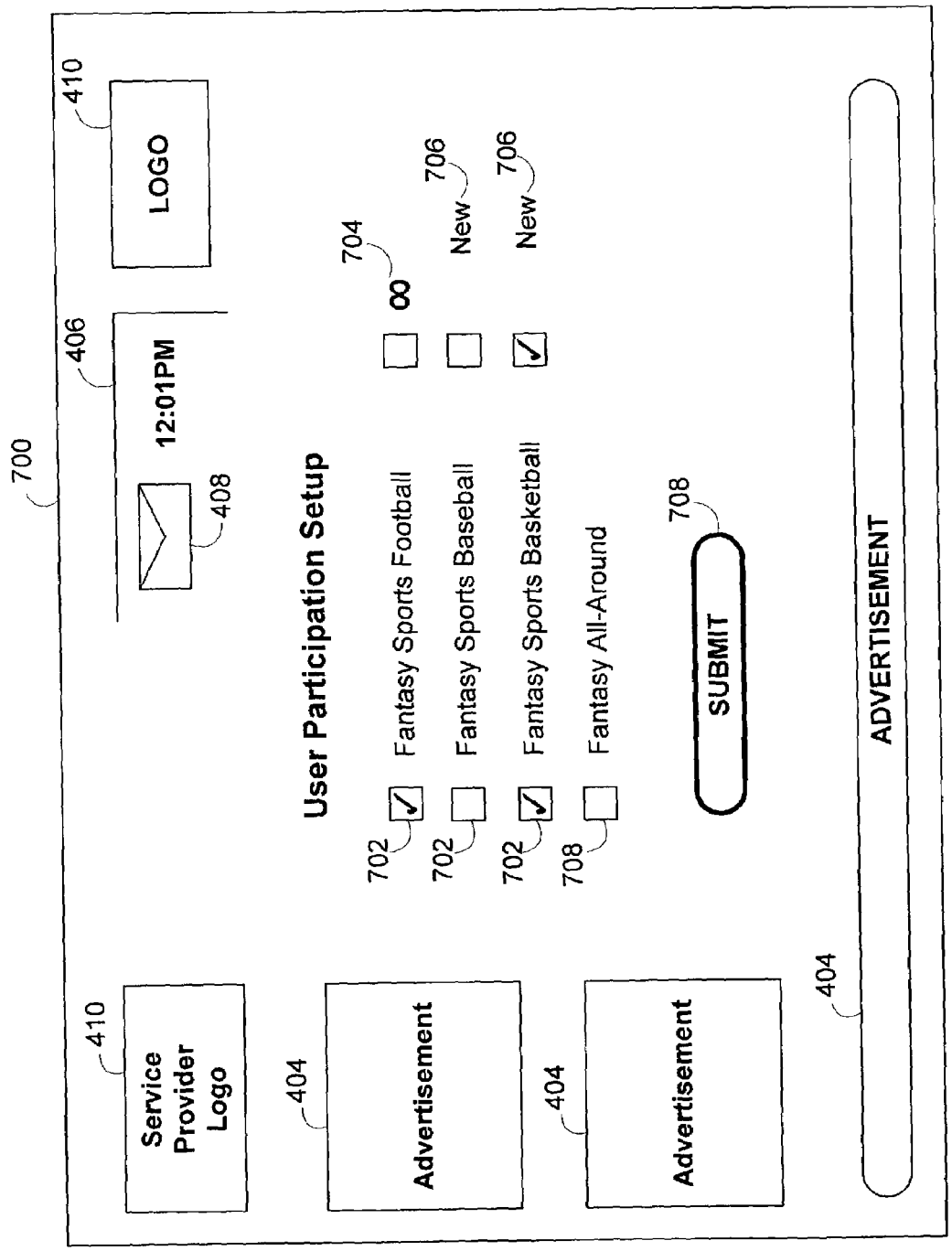
FIG. 7 is an illustrative fantasy sports contest application user participation setup screen in accordance with one embodiment of the present invention.

FIG. 7 shows an illustrative fantasy sports contest application user participation setup screen 700 in accordance with one embodiment of the present invention. The fantasy sports contest application may show screen 700, for example, in response to the user submitting user setup information as shown in FIG. 6, in response to the user selecting a league setup option in a fantasy sports contest application screen, or in response to any other suitable approach. Screen 700 may include one or more fantasy sports having corresponding leagues that the user may participate in (e.g., football, baseball, basketball, etc.). The user may select one or more fantasy sports to participate in by, for example, marking checkboxes 702 associated with the desired fantasy sports.

For users who have indicated a desire to view family league information in selection area 606 of FIG. 6, the fantasy sports contest application may provide additional family league information corresponding to each fantasy sport in screen 700. Fantasy sports that have corresponding existing family leagues may have an additional associated checkbox displayed with an association symbol 704 to show that the user may participate in the family league by marking the checkbox. Fantasy sports that do not have a corresponding existing family league may have an associated checkbox displayed with a new symbol 706 to indicate that the user may mark the checkbox to create a new family league for that fantasy sport. In this example, the user has indicated a desired to participate in a fantasy sports basketball league and to create a new family basketball league. The user may use submit button 708 to submit the user participation setup information.

Fantasy sports contest application user participation setup screen 700 is merely illustrative of such a display screen. Various other suitable arrangements may be used in its place.

Figure 8:
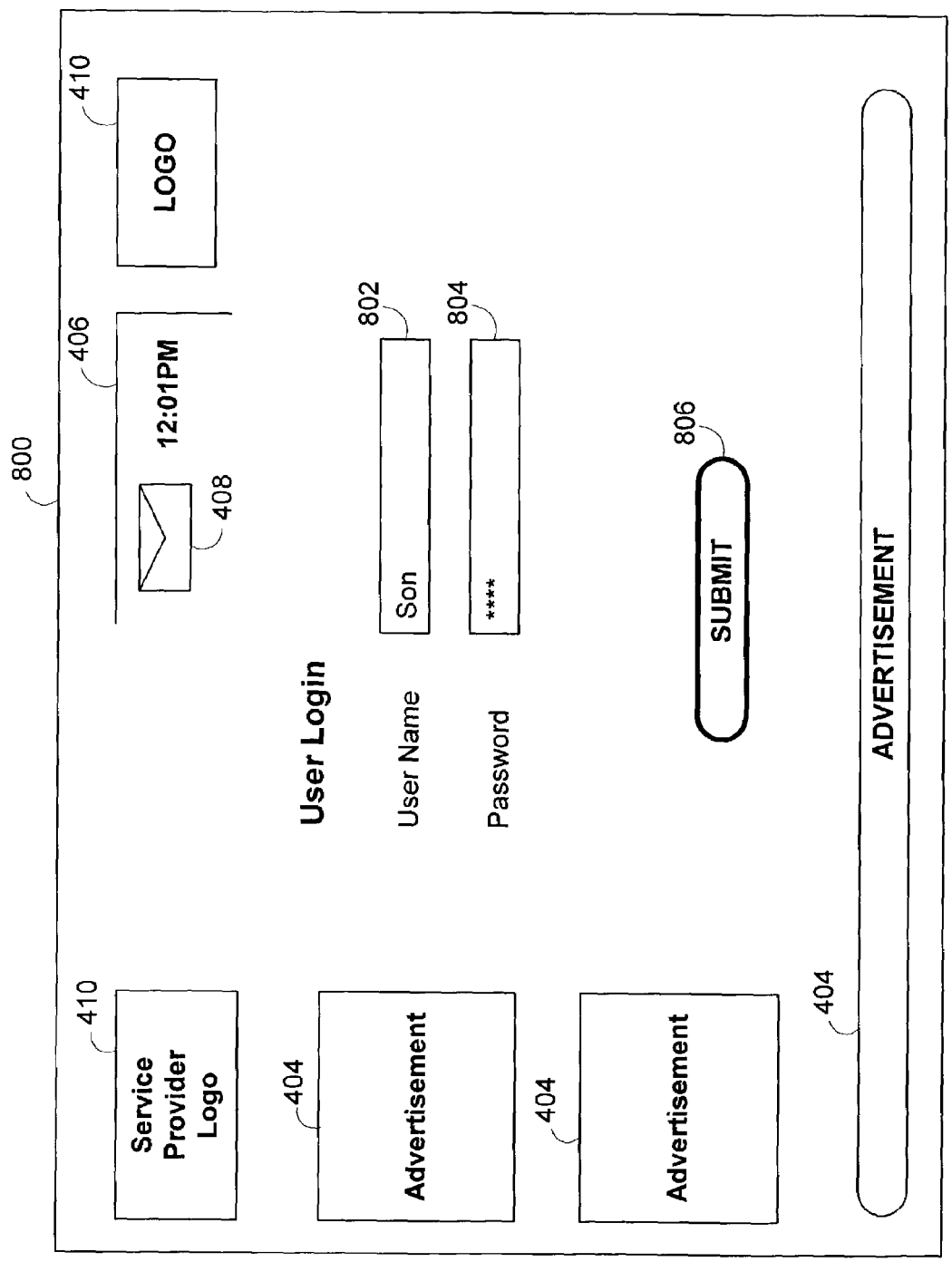
FIG. 8 is an illustrative fantasy sports contest application user login screen in accordance with one embodiment of the present invention.

FIG. 8 shows a fantasy sports user login screen 800 in accordance with one embodiment of the present invention that may be shown in response to a user selecting login option 506 in FIG. 5. Login screen 800 may prompt a registered user to supply a user name and a corresponding password for authentication in fields 802 and 804 respectively. The user may submit the identification information using submit button 806. The fantasy sports contest application may determine the user's identity, for example, by comparing the supplied login information to saved login information such as, for example, user identification information supplied by the user during user setup (FIG. 6), or using any other suitable approach for user recognition. The fantasy sports contest application may use the identity of the user to retrieve user account information for personalizing fantasy sports information and displays (e.g., performance information, league information, team information, user interface, etc.) for the user.

Fantasy sports user login screen 800 is merely illustrative of such a display screen. Various other suitable arrangements may be used in its place.

Figure 9:
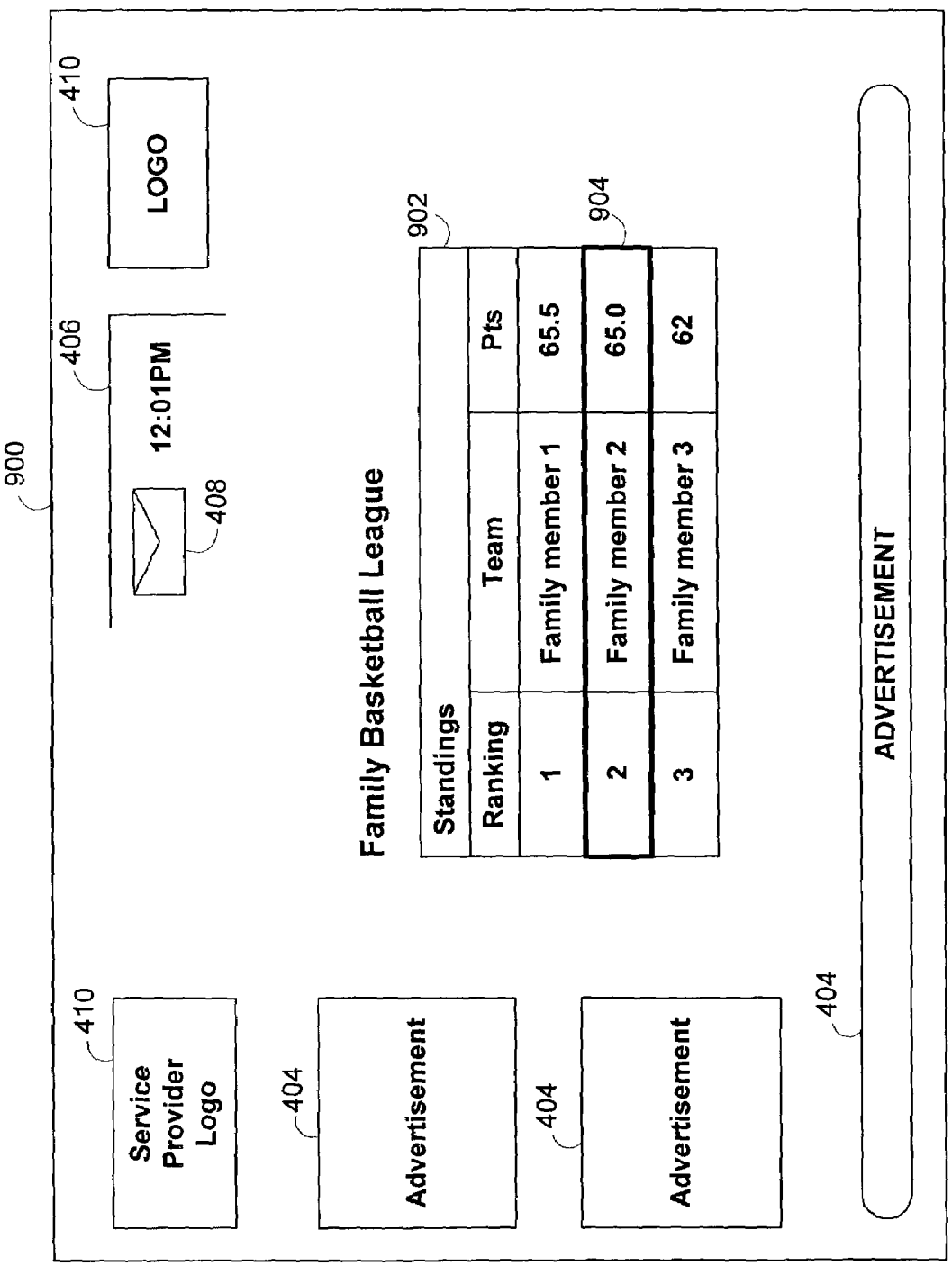
FIG. 9 is an illustrative fantasy sports contest application family basketball league performance screen in accordance with one embodiment of the present invention.

FIG. 9 shows an illustrative family basketball league performance screen 900 that may be shown in response to the user logging in to a fantasy sports contest application (FIG. 8). In this example, screen 900 displays personalized performance information in the family basketball league. Screen 900 may include a standings table that displays ranking related information for the family basketball league. Ranking related information may include, for example, rankings, team names, points accumulated, or any other suitable performance information. The fantasy sports contest application may indicate ranking information associated with the user by, for example, using highlight region 904, using a different color, using animation, or using any other suitable indicator. Ranking information shown in standings table 902 may also have associated links that may present the user with additional information associated with the ranking when selected. A user may select the link associated with a ranking by, for example, using up or down buttons on a remote control to position highlight region 904 over the ranking and pressing an "enter" or "ok" button on a remote control, clicking on the ranking information with a mouse, or using any other suitable approach.

Family basketball league performance screen 900 is merely illustrative of such a display screen. Various other suitable arrangements may be used in its place.

In some embodiments of the present invention, the fantasy sports contest application may allow the user, who competes in multiple fantasy sports leagues involving different sports, to participate in one or more fantasy all-around leagues. A fantasy all-around league may be any league that allows the user to compete based on a combination of the user's performances in the multiple fantasy sports leagues involving different sports.

For example, the fantasy sports contest application may allow the user, who currently competes in a fantasy football league and a fantasy basketball league to participate in a fantasy all-around league that evaluates the user against other users based on a combination of the user's performances in the fantasy football league and the fantasy basketball league.

Figure 10:
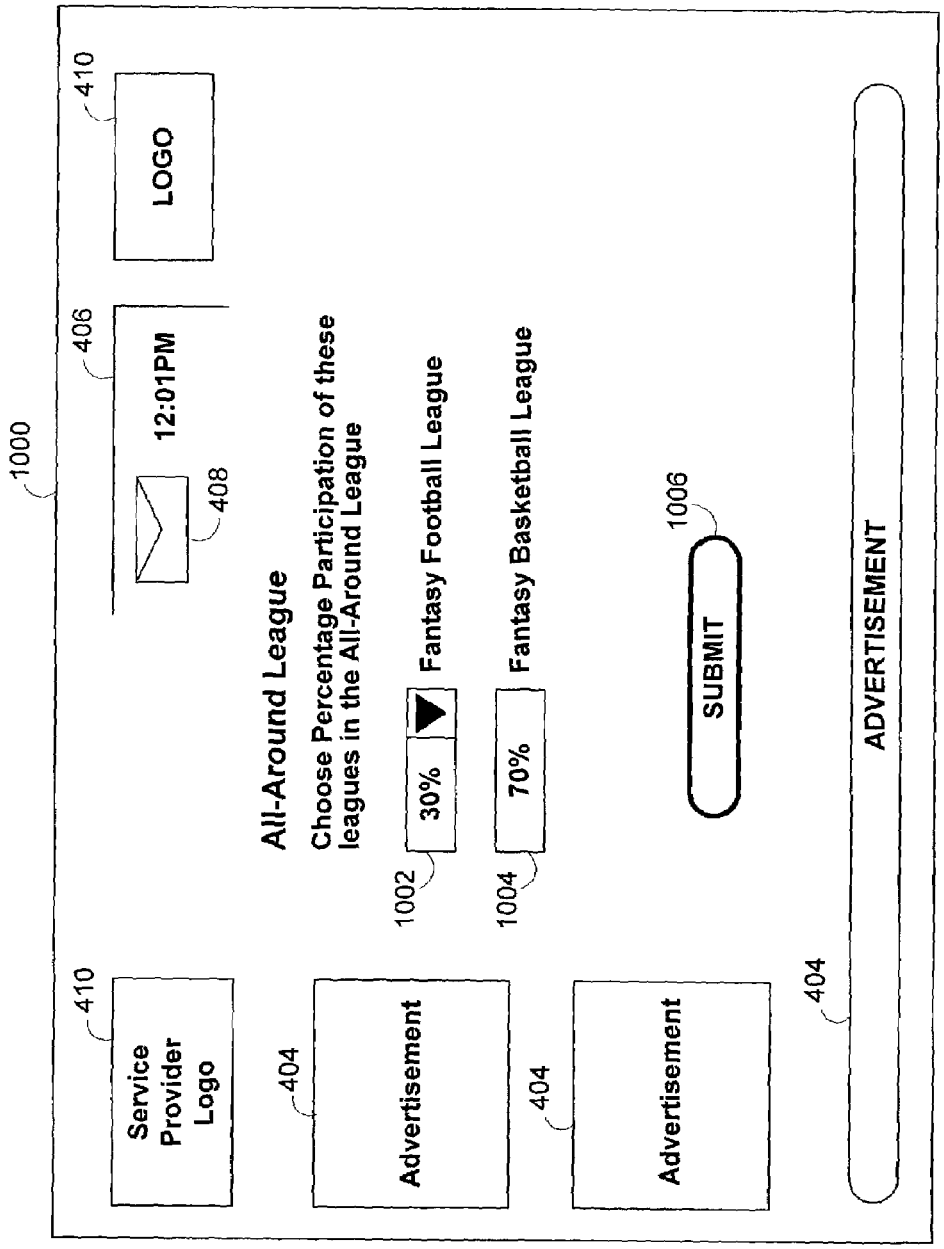
FIG. 10 is an illustrative fantasy sports contest application fantasy all-around league screen in accordance with one embodiment of the present invention.

FIG. 10 shows such an illustrative fantasy sports contest application fantasy all-around league screen 1000 in accordance with one embodiment of the present invention. Screen 1000 may be shown in response to, for example, the user selecting to participate in an all-around league during setup (FIG. 7) or using any other suitable approach.

In this example, screen 1000 provide an opportunity for the user to select the percentage participation for each of the two leagues (e.g., fantasy football league and fantasy basketball league, or fantasy college football league and fantasy professional NFL football league) involved in the evaluation of the user's performance in the all-around league. The fantasy sports contest application has selected these two leagues based on the user's selections during participation setup in screen 700 of FIG. 7. Because the all-around league must include at least two leagues involving different sports, the fantasy sports contest application automatically selects the user's leagues when the user participates in only two leagues involving different sports.

In this example, the user may select the percentage participation of one of the leagues (e.g., fantasy football league) using drop down menu 1002. In response to the user selecting the percentage participate of one of the leagues, the fantasy sports contest application may fill in the percentage participation of the other league (e.g., fantasy basketball league) in textbox 1004. The user may submit the selected percentages using submit button 1006. Alternatively, the fantasy sports contest application, the commissioner of the league, or any other suitable entity, may set the percentage for the user.

Fantasy all-around league screen 1000 is merely illustrative of such a display screen. Various other suitable arrangements may be used in its place.

In some embodiments of the present invention, the fantasy sports contest application may determine that the user currently competes in more than two fantasy sports leagues involving different sports. In these embodiments, the fantasy sports contest application may allow the user to choose a subset that includes at least two of these leagues for evaluation in the all-around league.

For example, the fantasy sports contest application may allow the user who currently competes in a fantasy football league, a fantasy basketball league, and a fantasy baseball league, to choose any subset that includes at least two of the three leagues for evaluation in the all-around league. The user may choose, for example, the football league and the basketball league, the football league and the baseball league, the basketball league and the baseball league, or all three of the leagues for evaluation in the all-around league.

In some embodiments of present invention, the fantasy sports contest application may allow the user to select the percentage participation of each fantasy sports league that is involved in the calculation of the user's performance in the all-around league. For example, the user in the previous example may choose to assign a weight of thirty percent to the user's performance in the fantasy football league in the calculation of the user's performance in the fantasy all-around league. Because the user's all-around league includes only two leagues, the fantasy sports contest application may then automatically assign a weight of seventy percent to the user's performance in the basketball league in the calculation of the user's performance in the fantasy all-around league. In some embodiments, the fantasy sports contest application may assign set percentages for each of the leagues involved.

Figure 11:
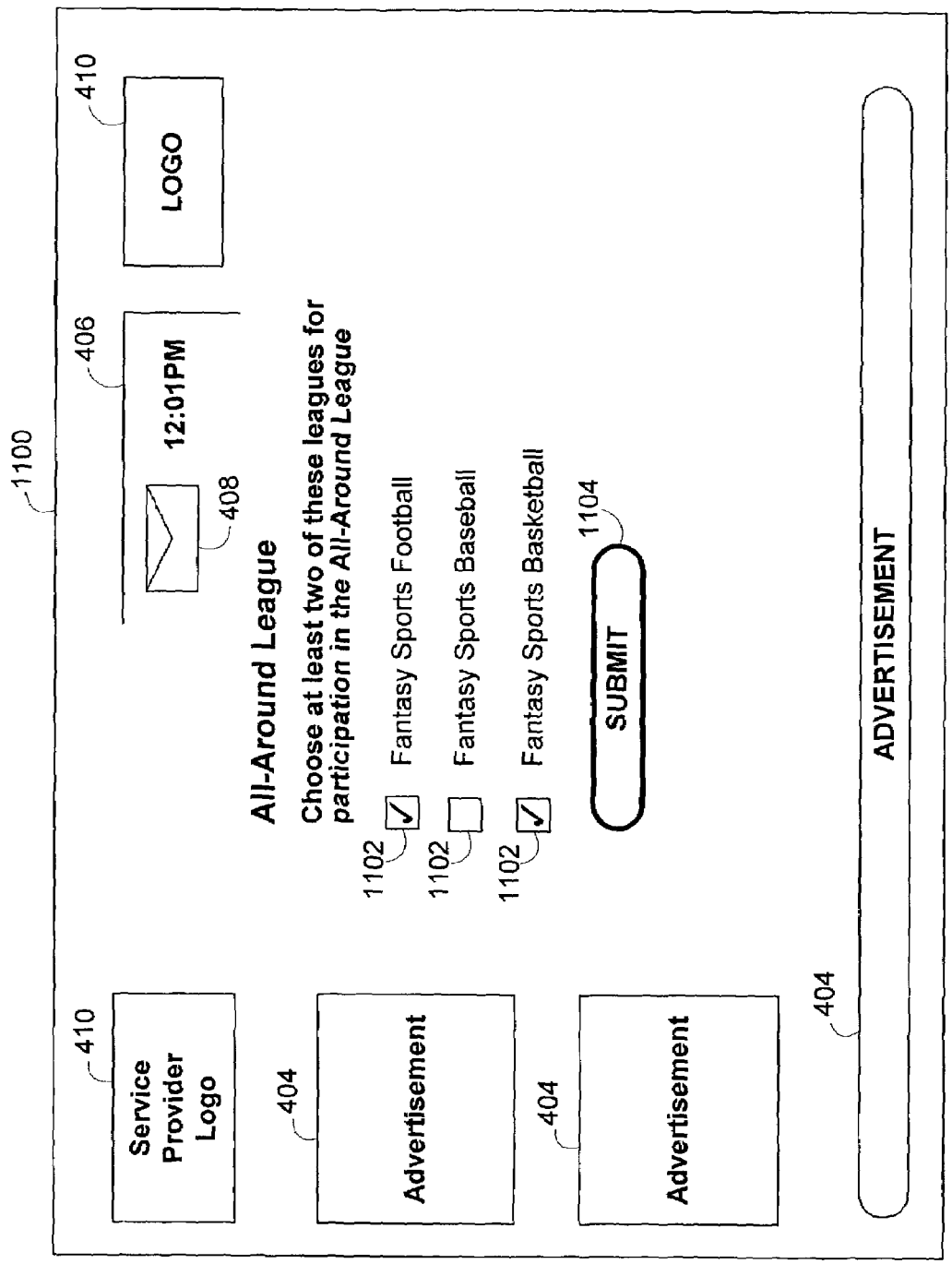
FIG. 11 is another illustrative fantasy sports contest application fantasy all-around league screen in which the user may choose the participating league in accordance with one embodiment of the present invention.

FIG. 11 shows another illustrative fantasy sports contest application all-around league screen 1100 in accordance with one embodiment of the present invention. Screen 1100 may be show in response to, for example, the user selecting fantasy all-around option 708 on screen 700 (FIG. 7) or using any other suitable approach.

In this example, the fantasy sports contest application has determined that the user currently participates in more than two fantasy sports leagues involving different sports. In response to this determination, the fantasy sports contest application presents on screen 1100 those fantasy sports leagues that the user may select from for participation in the all-around league. The fantasy sports contest application may further present on screen 1100 an instruction to instruct that the user must select at least two of the shown leagues.

The user may indicate selections of leagues by selecting checkboxes 1102. The user may submit the selections using submit button 1104. The rotisserie sports contest application may prevent the user from leaving screen 1100 in response to the user selecting less than two leagues.

Fantasy all-around league screen 1100 is merely illustrative of such a display screen. Various other suitable arrangements may be used in its place.

In some embodiments of the present invention, real-life players that have been selected in one type of fantasy sports league in a first season may be made available for pre-draft selection in another type of fantasy sports league in a second season on a right of first refusal basis to users who previously had those players on their rosters. For example, a college basketball player in the 2000 season may be drafted in real-life as an NBA player in the 2001 season. In an application that supports both college and professional basketball and uses a draft that limits the number of users that may select a given real-life player, the fantasy sports contest application may make the player, who was on the user's fantasy college basketball roster available for selection by the user in the fantasy NBA leagues in the 2001 contest. This feature is particularly useful to the user in leagues that use exclusive rosters (e.g., leagues in which real-life players may only be on a fixed number of rosters—typically, on just one roster). This feature rewards the user who is able to identify skilled players early in their careers. The feature may also be apply to sports in which athletes may be promoted in real-life to more competitive leagues (e.g., the English Premiership football league).

In the event that the user declines his first right to refusal by a set deadline or fails to make any required adjustments to his roster (e.g., reducing the number of player to within a set maximum), the fantasy sports contest application may then make the real-life player available to other users.

In some embodiments of the present invention, the fantasy sports contest application may determine, in response to the user selecting to participate in a fantasy sports league, whether the user has drafted players for other fantasy sports leagues that are now available for draft in the fantasy sports league that the user is currently trying to participate in. If the fantasy sports contest application identifies at least one of such players, the fantasy sports contest application may allow the user to select at least some of those players for inclusion in the user's team for the fantasy sport league that the user is currently trying to participate in.

Figure 12:
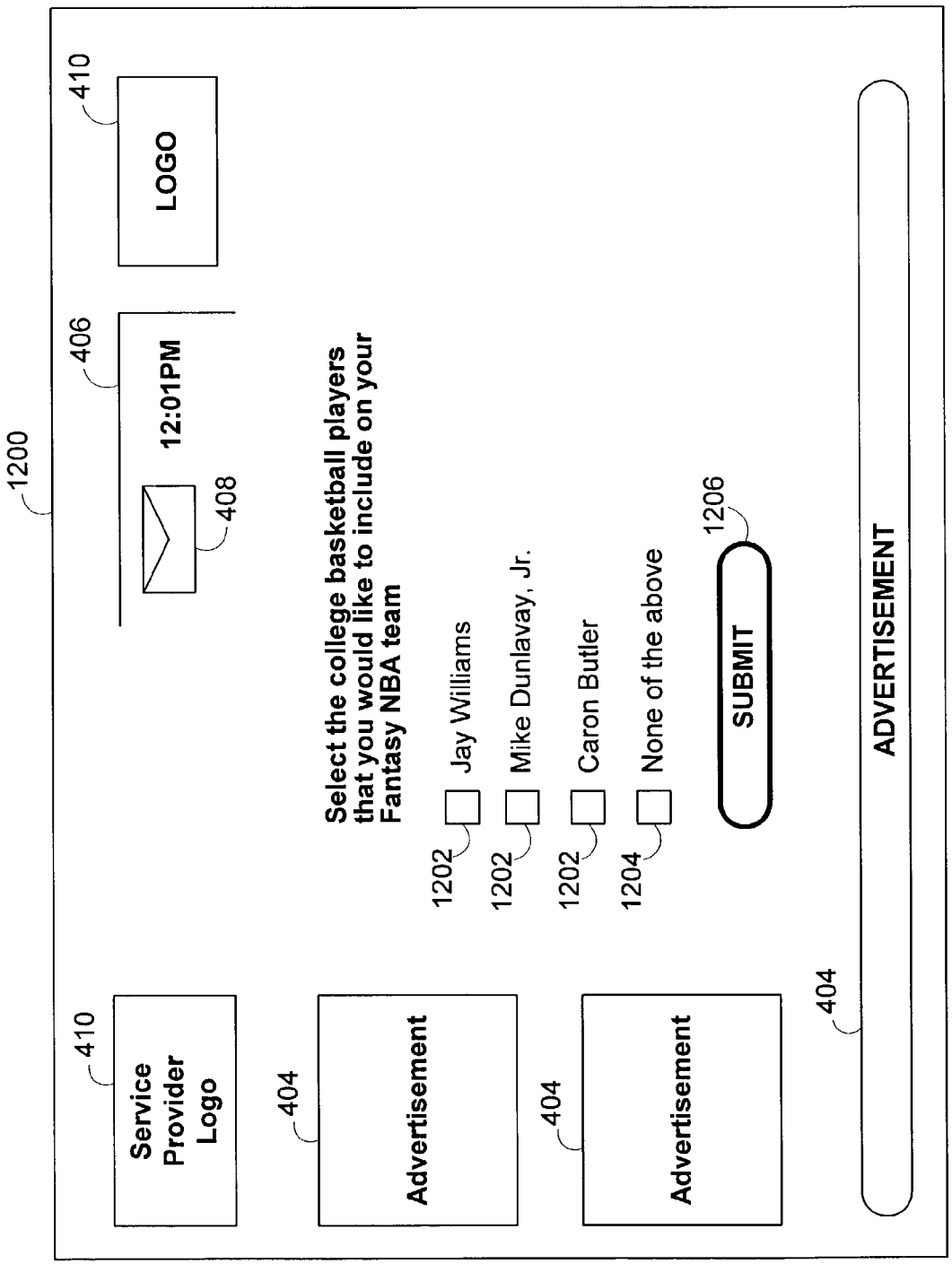
FIG. 12 is an illustrative fantasy sports contest application team draft screen in accordance with one embodiment of the present invention.

FIG. 12 shows an illustrative fantasy sports contest application team draft screen 1200 in accordance with one embodiment of the present invention. Screen 1200 may be shown in response to the fantasy sports contest application determining that the user has drafted players for other fantasy sports leagues that are now available for draft in the fantasy sports league that the user is currently trying to participate in.

In this example, screen 1200 is shown in response to the user attempting to draft a team for a fantasy NBA league. The fantasy sports contest application has determined that the user has previous drafted three players for the user's fantasy college basketball league that are now available for draft in the fantasy NBA league. In response to making this determination, the fantasy sports contest application presents these players to the user on screen 1200. The user may select one or more of these players for inclusion on the user's team in the fantasy NBA league by, for example, selecting one or more checkboxes 1202. The user may also decline to select any of these players by, for example, selecting checkbox 1204. The user may submit the selections using submit button 1206.

Team draft screen 1200 is merely illustrative of such a display screen. Various other suitable arrangements may be used in its place.

Figure 13:
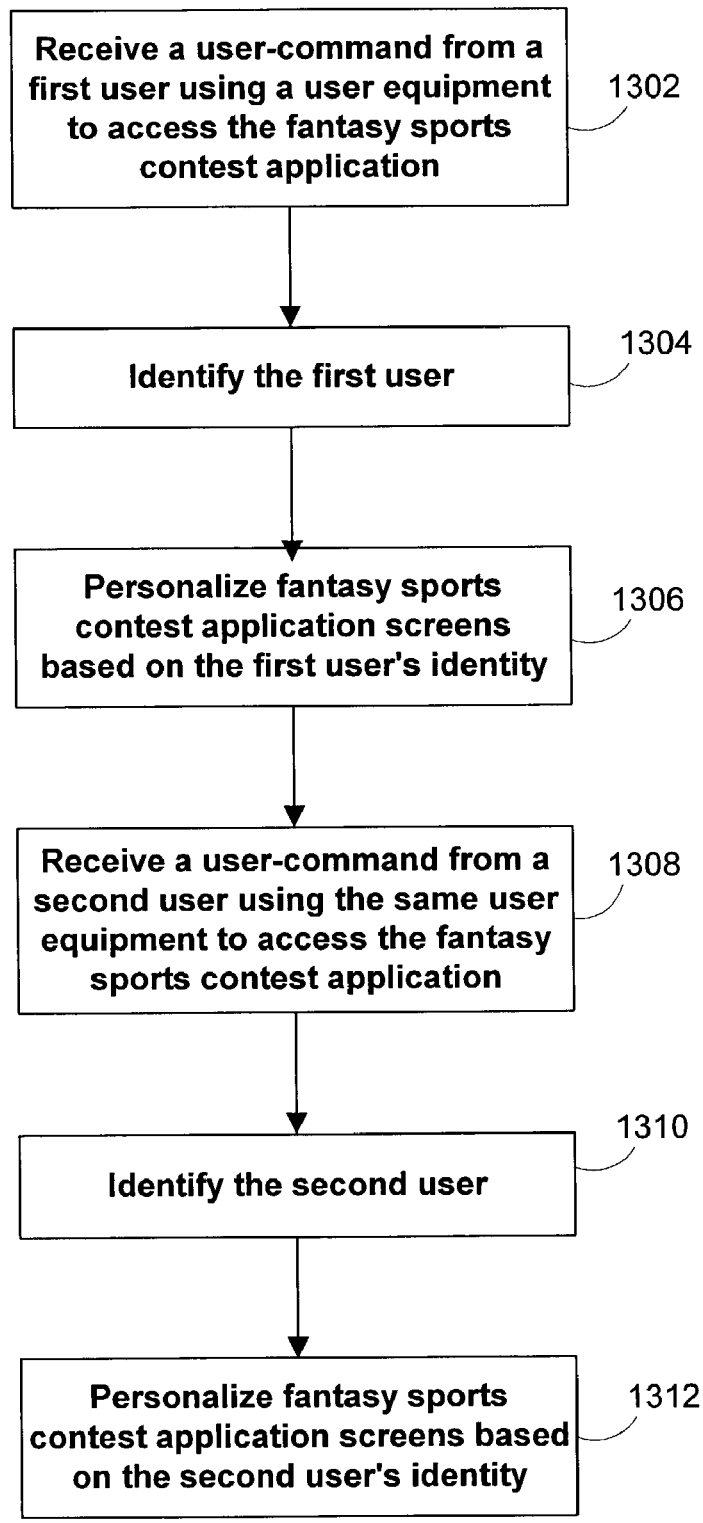
FIG. 13 is a flow chart of illustrative steps involved in personalizing fantasy sports contest application information and displays to the user in accordance with one embodiment of the present invention.

FIG. 13 is a flow chart of illustrative steps involved in personalizing fantasy sports contest application information and displays for multiple user based on the users' identity in accordance with one embodiment of the present invention.

At step 1302, the fantasy sports contest application receives a user-command from a first user using a user equipment. The user may issue user-command by, for example, attempting to log into the fantasy sports contest application (FIG. 8), completing user account setup (FIGS. 6 and 7), or performing any other suitable action.

In response to receiving the user-command, the fantasy sports contest application identifies the first user and retrieves the first user's account information at step 1304. The fantasy sports contest application may determine the user's identity by, for example, comparing the first user's login information to saved identification information in user accounts, or using any other suitable method of user recognition.

At step 1306, the fantasy sports contest application personalizes the fantasy sports contest application information and displays (e.g., user performance information, league information, team information, fantasy sports contest application interface, etc.) to the user based on the user's identity determined at step 1304.

At step 1308, the fantasy sports applicant receives a user-command to access the fantasy sports contest application from a second user using the same user equipment as the user equipment used by the first user. The second user may issued the user-command by, for example, logging in to the fantasy sports contest application (FIG. 8), completing user account setup (FIGS. 6 and 7), or using any other suitable approach.

The fantasy sports contest application identifies the second user at step 1310 and retrieves the second user's account information by, for example, comparing the second user's login information to user identification information saved in user accounts, or using any other suitable method for user identification.

At step 1312, the fantasy sports contest application personalizes the fantasy sports contest application information and displays (e.g., user performance information, league information, team information, the fantasy sports contest application interface, etc.) to the second user based on the second user's identity determined at step 1312.

Figure 14:
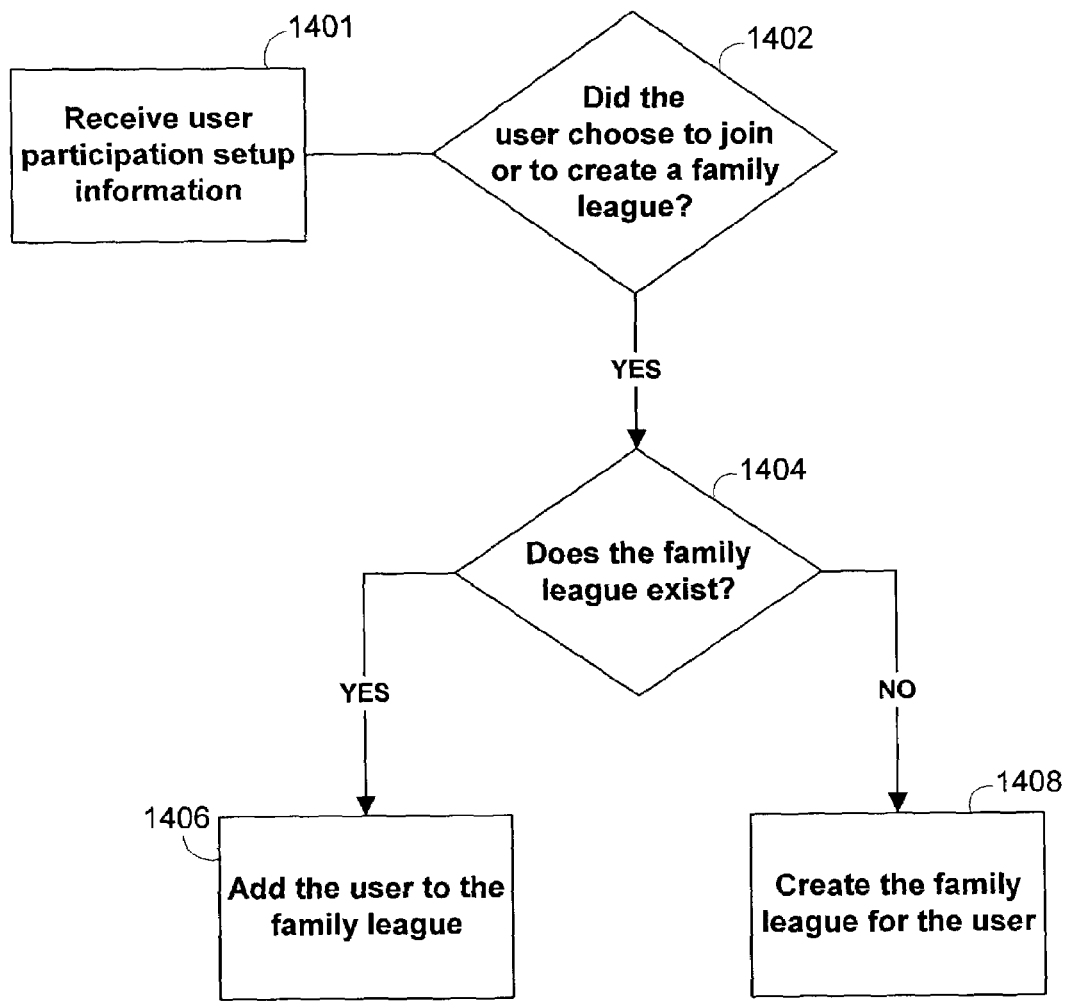
FIG. 14 is a flow chart of illustrative steps involved in fantasy sports user participation setup in accordance with one embodiment of the present invention

FIG. 14 shows a flow chart of illustrative steps involved in user participation setup (FIG. 7) in accordance with one embodiment of the present invention.

At step 1401, the fantasy sports contest application receives user participation setup information from the user. User participation setup information may be, for example, fantasy sports category selection information, family league selection information, or any other suitable information as shown in FIG. 7.

In response to receiving the user participation setup information, the fantasy sports contest application determines whether the user had selected to join or create a family league at step 1402. The fantasy sports contest application may determine this information by, for example, examining whether the user has marked the checkboxes associated with the family leagues in FIG. 7, or using any other suitable approach.

If the user has selected to join or create a family league, the fantasy sports contest application may determine whether the family league already exists at step 1404. The fantasy sports contest application may determine this information by, for example, examining whether the checkboxes associated with family leagues displayed with new link symbols 706 are marked by the user, or using any other suitable approach.

If it is determined that the user-selected family league already exists, the fantasy sports contest application may add the user to the existing family league at step 1406.

If it is determined that the user-selected family league does not exist, the fantasy sports contest application may create the user-selected family league for the user at step 1408.

Figure 15:
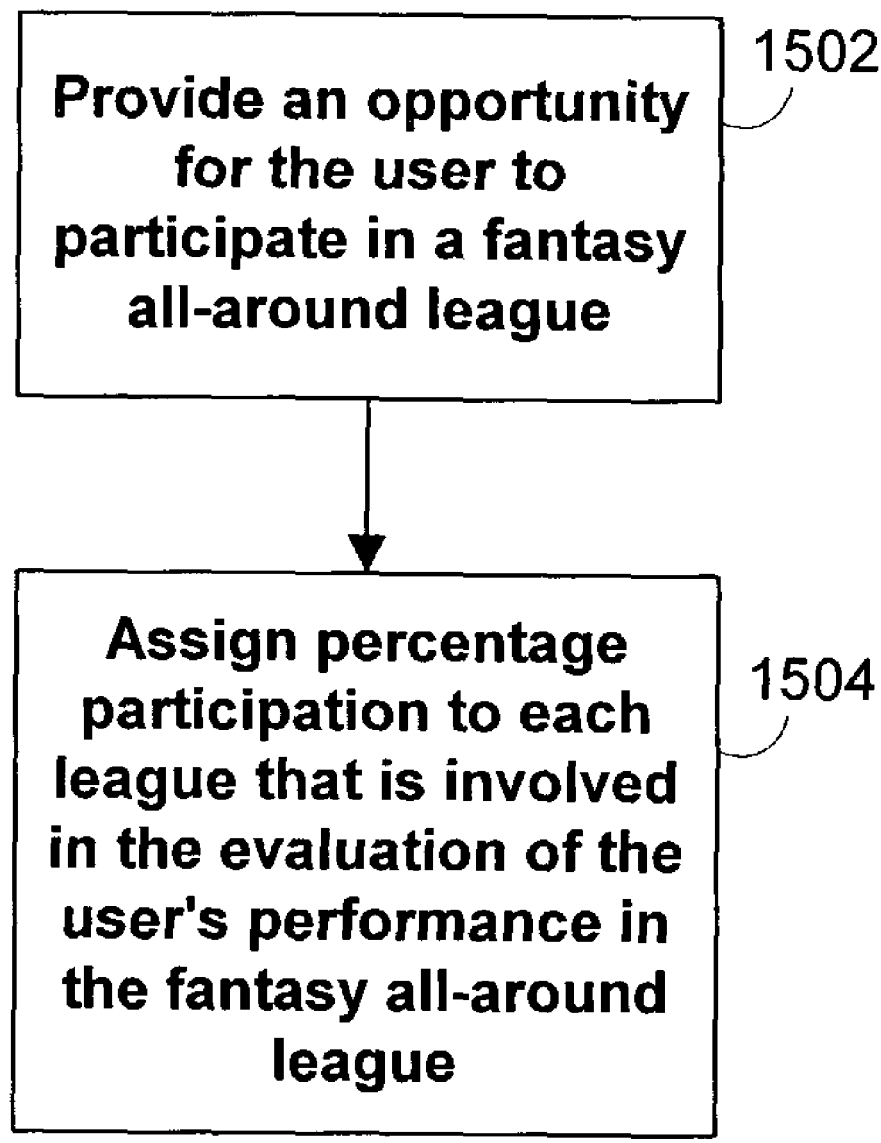
FIG. 15 is a flow chart of illustrative steps involved in allowing the user to participate in a fantasy all-around league in accordance with one embodiment of the present invention.

FIG. 15 shows a flow chart of illustrative steps involved in allowing the user to participate in a fantasy all-around league in accordance with one embodiment of the present invention. At step 1502, the fantasy sports contest application provides the user with an opportunity for participating in a fantasy all-around league in which the user's performance may be determined by a combination of the user's performances in multiple fantasy sports leagues involving different sports.

At step 1504, the fantasy sports contest application may assign the percentage participation of each league that is involved in the evaluation of the user's performance in the fantasy all-around league.

Figure 16:
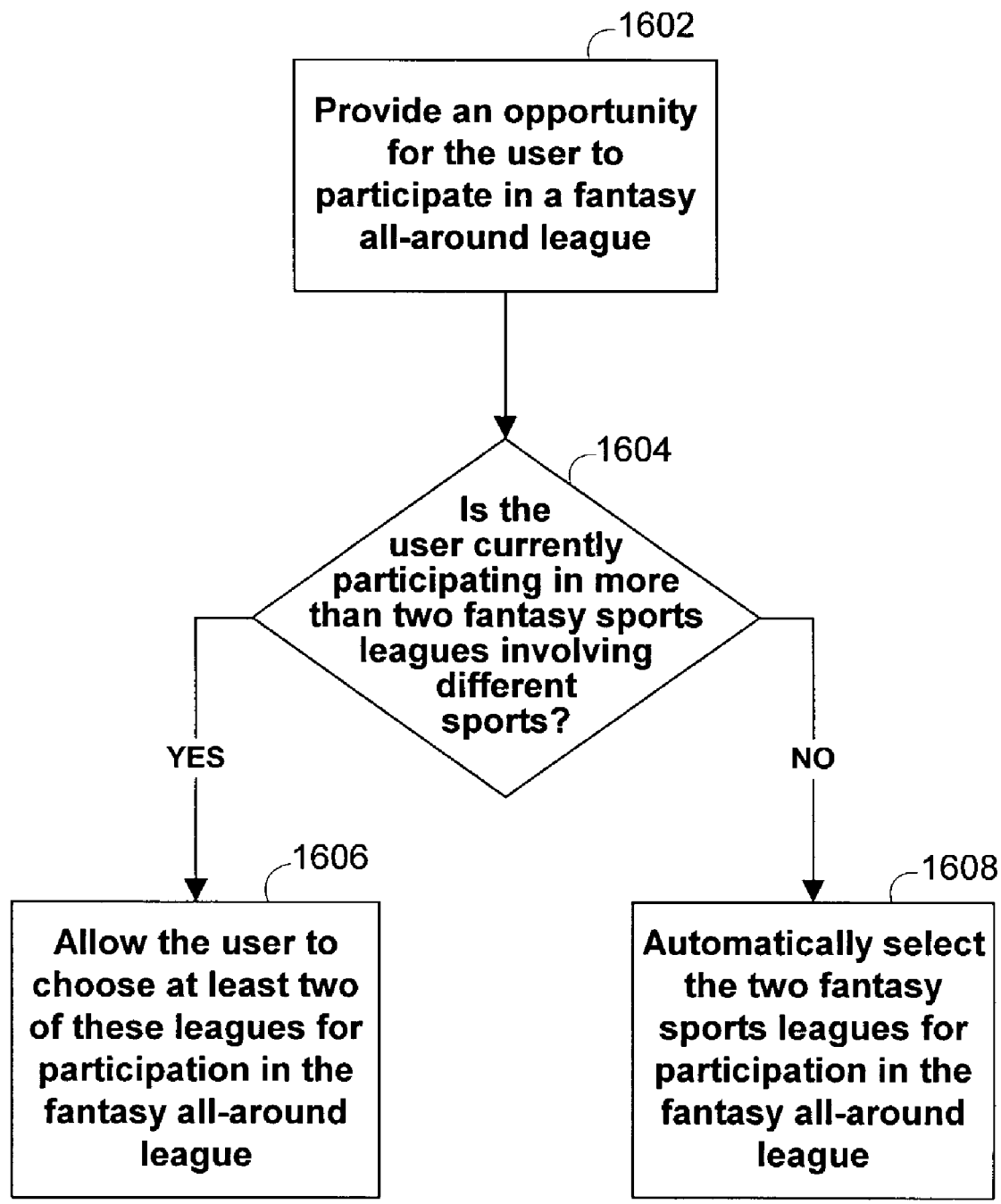
FIG. 16 is a more detailed flow chart of illustrative steps involved in providing an opportunity for the user to participate in a fantasy all-around league in accordance with one embodiment of the present invention.

FIG. 16 shows a more details flow chart of illustrative steps involved in providing an opportunity for the user to participate in a fantasy all-around league. At step 1602, the fantasy sports contest application provides the opportunity for participating in the fantasy all-around league to the user.

The fantasy sports contest application then determines whether the user is currently participating in more than two fantasy sports leagues involving different sports at step 1604.

If the user is currently participating in more than two fantasy sports leagues involving different sports, the fantasy sports contest application allows the user to select at least two of the leagues that the user is currently participating in for participation in the evaluation of the user's performance in the fantasy all-around league at step 1606.

If the user is currently only participating in two fantasy sports league involving different sports, the fantasy sports contest application automatically selects those two fantasy sports league for participation in the evaluation of the user's performance in the fantasy all-around league at step 1608.

Figure 17:
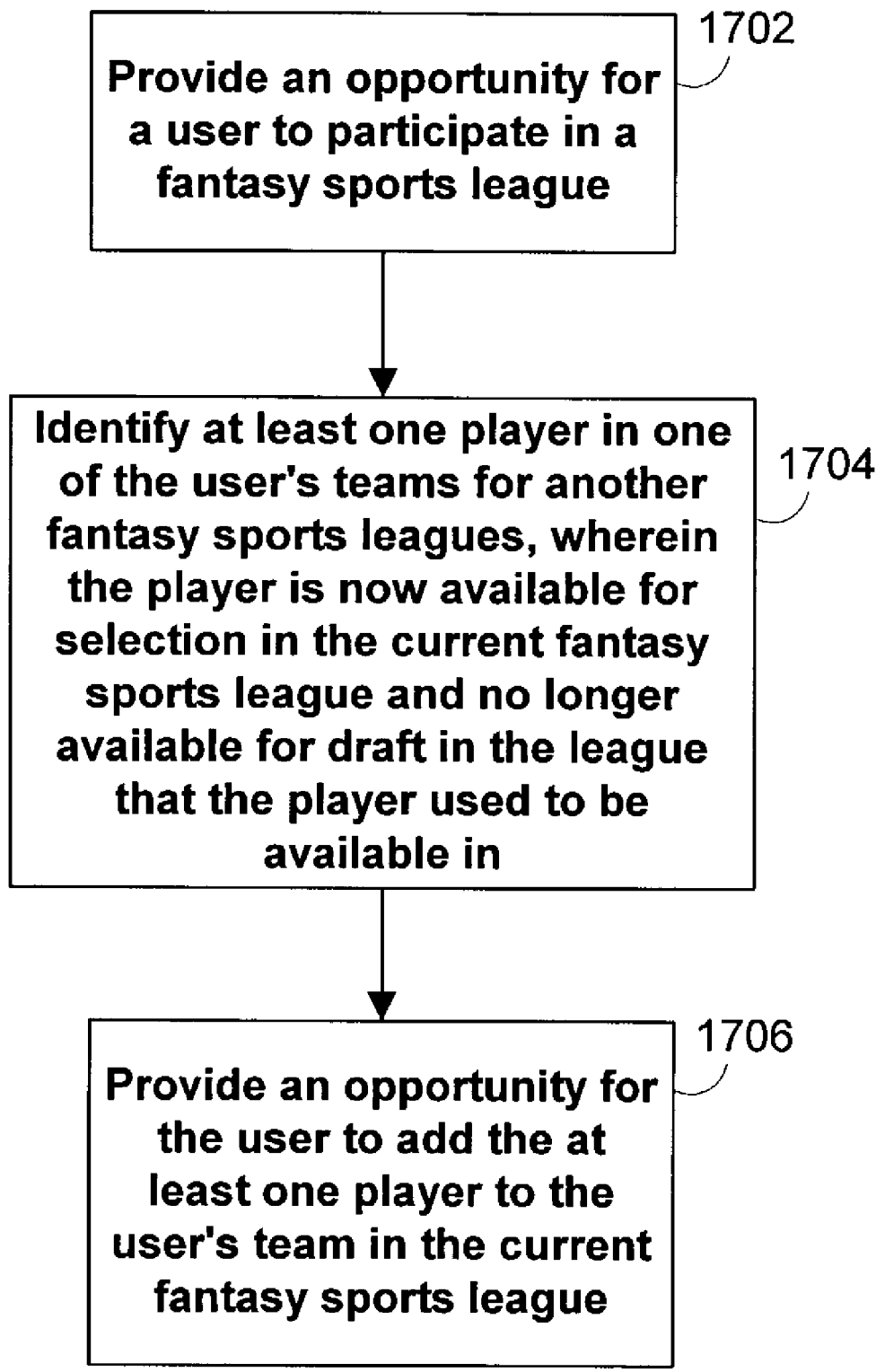
FIG. 17 is a flow chart of illustrative steps involved in allowing the user select players drafted in one league for the team in another league in accordance with one embodiment of the present invention.

FIG. 17 shows a flow chart of illustrative steps involved in allowing the user to select players drafted in one league for inclusion in the team in another league in accordance with one embodiment of the present invention. At step 1702, the fantasy sports contest application provides an opportunity for the user to participate in a fantasy sports league.

At step 1704, the fantasy sports contest application identifies at least one real-life player that is in one of the user's teams for another fantasy sports league, wherein the real-life player is now available for selection in the fantasy sports league that the user is currently trying to participate in and no longer available for draft in the fantasy sports league that the real-life player used to be available in (e.g., a college basketball player who has joined the NBA, so the player is no longer available for selection in fantasy college basketball league and is now available in the fantasy NBA basketball league).

In response to identifying the at least one real-life player, the fantasy sports contest application provides the user with an opportunity to add the at least one player to the user's team in the fantasy sports league that the user is currently trying to participate in.

Thus, systems and methods for providing multiple user support for shared user equipment in a fantasy sports contest application are provided. One skilled in the art will appreciate that the present invention can be practiced by other than the described embodiments, which are presented for purposes of illustration and not of limitation, and the present invention is limited only by the claims which follow.

What is claimed is:

1. A method for allowing a user to participate in a fantasy sports contest in which the user's performance is calculated by combining the user's performances in two or more fantasy sports contest leagues, the method comprising:
   providing an opportunity to the user to participate in the fantasy sports contest; and
   assigning percentage participation to each of the two or more fantasy sports contest leagues, wherein the percentage participation determines the percentage of the user's performance in the each of the two or more fantasy sports contest leagues that will be used to calculate the user's performance in the fantasy sports contest.

2. The method of claim 1, wherein the two or more fantasy sports contest leagues are leagues involving different sports.

3. The method of claim 1, wherein providing an opportunity to the user to participate in the fantasy sports contest comprises:
   determining whether the user currently participates in more than two fantasy sports contest leagues, wherein the more than two fantasy sports contest leagues are league involving different sports;
   in response to determining that the user is currently participating in more than two fantasy sports contest leagues, allowing the user to select at least two of the more than two fantasy sports contest leagues to contribute to the user's performance in the fantasy sports contest; and
   in response to determining that the user is currently participating in two fantasy sports contest leagues, automatically selecting the two fantasy sports contest leagues to contribute to the user's performance in the fantasy sports contest.

4. A method for allowing a user to add a real-life player on the user's team in a first fantasy sports contest to the user's team in a second fantasy sports contest, the method comprising:
   providing an opportunity for the user to participate in the second fantasy sports contest;
   identifying a real-life player on the user's team in the first fantasy sports contest, wherein the real-life player is no longer available to be drafted in the first fantasy sports contest and the real-life player is now available to be drafted in the second fantasy sports contest; and
   providing an opportunity for the user to add the real-life player to the user's team in the second fantasy sports contest.

5. A system for allowing a user to participate in a fantasy sports contest in which the user's performance is calculated by combining the user's performances in two or more fantasy sports contest leagues, the system comprising:
   means for providing an opportunity to the user to participate in the fantasy sports contest; and
   means for assigning percentage participation to each of the two or more fantasy sports contest leagues, wherein the percentage participation determines the percentage of the user's performance in the each of the two or more fantasy sports contest leagues that will be used to calculate the user's performance in the fantasy sports contest.

6. The system of claim 5, wherein the two or more fantasy sports contest leagues are leagues involving different sports.

7. The system of claim 5, wherein the means for providing an opportunity to the user to participate in the fantasy sports contest comprises:
   means for determining whether the user currently participates in more than two fantasy sports contest leagues, wherein the more than two fantasy sports contest leagues are league involving different sports;
   in response to determining that the user is currently participating in more than two fantasy sports contest leagues, means for allowing the user to select at least two of the more than two fantasy sports contest leagues to contribute to the user's performance in the fantasy sports contest; and
   in response to determining that the user is currently participating in two fantasy sports contest leagues, means for automatically selecting the two fantasy sports contest leagues to contribute to the user's performance in the fantasy sports contest.

8. A system for allowing a user to add a real-life player on the user's team in a first fantasy sports contest to the user's team in a second fantasy sports contest, the system comprising:
   means for providing an opportunity for the user to participate in the second fantasy sports contest;
   means for identifying a real-life player on the user's team in the first fantasy sports contest, wherein the real-life player is no longer available to be drafted in the first fantasy sports contest and the real-life player is now available to be drafted in the second fantasy sports contest; and
   means for providing an opportunity for the user to add the real-life player to the user's team in the second fantasy sports contest.

9. A system for allowing a user to participate in a fantasy sports contest in which the user's performance is calculated by combining the user's performances in two or more fantasy sports contest leagues, the system comprising:
   a user input device;
   a user output device comprising a display device; and
   server equipment and user equipment configured to:
   provide an opportunity to the user to participate in the fantasy sports contest; and
   assign percentage participation to each of the two or more fantasy sports contest leagues, wherein the percentage participation determines the percentage of the user's performance in the each of the two or more fantasy sports contest leagues that will be used to calculate the user's performance in the fantasy sports contest.

10. The system of claim 9, wherein the two or more fantasy sports contest leagues are leagues involving different sports.

11. The system of claim 9, wherein the server equipment and the user equipment are configured to:
   determine whether the user currently participates in more than two fantasy sports contest leagues, wherein the more than two fantasy sports contest leagues are league involving different sports;
   in response to determining that the user is currently participating in more than two fantasy sports contest leagues, allow the user to select at least two of the more than two fantasy sports contest leagues to contribute to the user's performance in the fantasy sports contest; and in response to determining that the user is currently participating in two fantasy sports contest leagues, automatically select the two fantasy sports contest leagues to contribute to the user's performance in the fantasy sports contest.

12. A system for allowing a user to add a real-life player on the user's team in a first fantasy sports contest to the user's team in a second fantasy sports contest, the system comprising:

a user input device;

a user output device comprising a display device; and server equipment and user equipment configured to:

provide an opportunity for the user to participate in the second fantasy sports contest;

identify a real-life player on the user's team in the first fantasy sports contest, wherein the real-life player is no longer available to be drafted in the first fantasy sports contest and the real-life player is now available to be drafted in the second fantasy sports contest; and provide an opportunity for the user to add the real-life player to the user's team in the second fantasy sports contest.

13. Machine-readable media for allowing a user to participate in a fantasy sports contest in which the user's performance is calculated by combining the user's performances in two or more fantasy sports contest leagues, wherein the machine-readable media is encoded with machine-readable instructions for performing the method comprising:

providing an opportunity to the user to participate in the fantasy sports contest; and assigning percentage participation to each of the two or more fantasy sports contest leagues, wherein the percentage participation determines the percentage of the user's performance in the each of the two or more fantasy sports contest leagues that will be used to calculate the user's performance in the fantasy sports contest.

14. The machine-readable media of claim 13, wherein the two or more fantasy sports contest leagues are leagues involving different sports.

15. The machine-readable media of claim 13, wherein providing an opportunity to the user to participate in the fantasy sports contest comprises:

determining whether the user currently participates in more than two fantasy sports contest leagues, wherein the more than two fantasy sports contest leagues are league involving different sports;

in response to determining that the user is currently participating in more than two fantasy sports contest leagues, allowing the user to select at least two of the more than two fantasy sports contest leagues to contribute to the user's performance in the fantasy sports contest; and in response to determining that the user is currently participating in two fantasy sports contest leagues, automatically selecting the two fantasy sports contest leagues to contribute to the user's performance in the fantasy sports contest.

16. Machine-readable media for allowing a user to add a real-life player on the user's team in a first fantasy sports contest to the user's team in a second fantasy sports contest, wherein the machine-readable media is encoded with machine-readable instructions for performing the method comprising:

providing an opportunity for the user to participate in the second fantasy sports contest;

identifying a real-life player on the user's team in the first fantasy sports contest, wherein the real-life player is no longer available to be drafted in the first fantasy sports contest and the real-life player is now available to be drafted in the second fantasy sports contest; and providing an opportunity for the user to add the real-life player to the user's team in the second fantasy sports contest.

* * * * *